(12) United States Patent
Kim et al.

(10) Patent No.: US 12,300,265 B2
(45) Date of Patent: *May 13, 2025

(54) SOUND PROCESSING METHOD USING DJ TRANSFORM

(71) Applicant: BRAINSOFT INC., Seoul (KR)

(72) Inventors: Dong Jin Kim, Seoul (KR); Ju Yong Shin, Seoul (KR)

(73) Assignee: BRAINSOFT INC., Seoul (KR)

( * ) Notice: Subject to any disclaimer, the term of this patent is extended or adjusted under 35 U.S.C. 154(b) by 208 days.

This patent is subject to a terminal disclaimer.

(21) Appl. No.: 18/089,814

(22) Filed: Dec. 28, 2022

(65) Prior Publication Data

US 2023/0215456 A1 Jul. 6, 2023

Related U.S. Application Data

(63) Continuation-in-part of application No. 17/288,459, filed as application No. PCT/KR2020/015910 on Nov. 12, 2020, now Pat. No. 11,574,646.

(30) Foreign Application Priority Data

Dec. 31, 2019 (KR) ........................ 10-2019-0179048

(51) Int. Cl.
*G10L 25/18* (2013.01)
*G10L 21/14* (2013.01)
*G10L 25/27* (2013.01)

(52) U.S. Cl.
CPC .............. *G10L 25/18* (2013.01); *G10L 21/14* (2013.01); *G10L 25/27* (2013.01)

(58) Field of Classification Search
CPC ......... G10L 25/18; G10L 21/14; G10L 25/27; H04R 29/008

(Continued)

(56) References Cited

U.S. PATENT DOCUMENTS 6,292,775 B1 * 9/2001 Holmes .................. G10L 15/10
704/256.1
2009/0063138 A1 * 3/2009 Sakurai .................. G10L 25/90
704/E11.001

(Continued)

FOREIGN PATENT DOCUMENTS

JP 2010-78990 A 4/2010
JP 2010102129 A 5/2010

(Continued)

OTHER PUBLICATIONS

International Search Report received for PCT/KR2020/015910, dated Feb. 22, 2021.

(Continued)

*Primary Examiner* — Paul Kim
*Assistant Examiner* — Douglas J Suthers
(74) *Attorney, Agent, or Firm* — MARSHALL, GERSTEIN & BORUN LLP

(57) ABSTRACT

Provided is a sound processing method performed by a computer, the method comprising generating a DJ transform spectrogram indicating estimated pure-tone amplitudes for respective frequencies corresponding to natural frequencies of a plurality of springs and a plurality of time points by modeling an oscillation motion of the plurality of springs having different natural frequencies, with respect to an input sound, and calculating the estimated pure-tone amplitudes for the respective natural frequencies; calculating degrees of fundamental frequency suitability based on a moving average of the estimated pure-tone amplitudes or a moving standard deviation of the estimated pure-tone amplitudes with respect to each natural frequency of the DJ transform spectrogram; and extracting the fundamental frequency based on local maximum values of the degrees of funda- (Continued)

mental frequency suitability for the respective natural frequencies at each of the plurality of time points.

13 Claims, 15 Drawing Sheets

(58) Field of Classification Search
USPC .......................................................... 381/56
See application file for complete search history.

(56) References Cited

U.S. PATENT DOCUMENTS

2010/0232619 A1* 9/2010 Uhle ................... G10L 21/0364
381/119
2011/0066210 A1* 3/2011 Wilson .................. A61F 11/045
607/57

FOREIGN PATENT DOCUMENTS

JP          2018072566 A    5/2018
KR         20010026290 A    4/2001

OTHER PUBLICATIONS

Thomas F. Quatieri, Discrete-Time Speech Signal Processing: Principles and Practice , Prentice-Hall Signal Processing Series, 2002. pp. 127-131.

* cited by examiner

SOUND PROCESSING METHOD USING DJ TRANSFORM

CROSS-REFERENCE TO RELATED APPLICATIONS

This application is a continuation-in-part of U.S. application Ser. No. 17/288,459 (filed on Apr. 23, 2021), now issued as U.S. Pat. No. 11,574,646, which claims the benefit of PCT Application PCT/KR2020/015910 (filed on Nov. 12, 2020), which claims the benefit of KR Application No. 10-2019-0179048 (filed on Dec. 31, 2019). The entirety of each of the foregoing applications is incorporated by reference herein.

TECHNICAL FIELD

The present disclosure relates to a sound processing method, and more particularly to a method of extracting a fundamental frequency based on DJ transform and recognizing a speaker or generating a voice using the extracted fundamental frequency, which is technology capable of simultaneously increasing temporal resolution and frequency resolution.

BACKGROUND

The human voice consists of several frequencies, and the lowest frequency among frequencies constituting the voice is called a fundamental frequency $f_0$. The other frequencies except for the fundamental frequency $f_0$ are integer multiples of the fundamental frequency $f_0$. A frequency set including the fundamental frequency $f_0$ and the frequencies that are integer multiples of the fundamental frequency $f_0$ is referred to a harmonic wave.

FIG. 10 is a diagram for explaining harmonic waves.

Whether a voice is high or low is determined based on the fundamental frequency. In general, women have a higher fundamental frequency than men and children have a higher fundamental frequency than women.

The fundamental frequency is one of the most useful pieces of information used to identify a speaker or to synthesize a sound. For example, the fundamental frequency is usefully used to separate a time range in which a customer speaks from a time range in which an agent speaks when the customer and the agent communicate via a call center or to verify a speaker in a security system. In addition, the fundamental frequency may be adjusted to synthesize the voice of a person, such as a small child, a female, or a male, or to synthesize the sound of an instrument.

In this regard, in order to extract the fundamental frequency, short-time Fourier Transform (STFT) has been used. However, STFT faces limitations with regard to simultaneously increasing temporal resolution and frequency resolution due to the Fourier uncertainty principle. That is, according to short-time Fourier Transform, if a sound of a short duration is transformed into frequency components, the resolution of the frequency components is relatively low, and if a sound with a longer duration is used to more precisely measure a frequency, the temporal resolution for the time at which the frequency component is extracted decreases.

Therefore, the present disclosure has been made in view of the above problems, and it is an object of the present disclosure to provide a fundamental frequency extraction method using DJ transform for simultaneously increasing temporal resolution and frequency resolution in order to recognize or synthesize a sound.

SUMMARY

In accordance with the present disclosure, the above and other objects can be accomplished by the provision of a sound processing method performed by a computer, the method comprising:
generating a DJ transform spectrogram indicating estimated pure-tone amplitudes for respective frequencies corresponding to natural frequencies of a plurality of springs and a plurality of time points by modeling an oscillation motion of the plurality of springs having different natural frequencies, with respect to an input sound, and calculating the estimated pure-tone amplitudes for the respective natural frequencies, wherein the generating the DJ transform spectrogram includes:
estimating expected steady-state amplitudes, each of which is a convergence value of an amplitude of each of the plurality of springs in a steady state, based on amplitudes at two time points having an interval there between equal to one natural period of each of the plurality of springs; and
calculating the estimated pure-tone amplitudes based on predicted pure-tone amplitudes that are amplitudes of the input sound estimated based on the expected steady-state amplitudes;
calculating degrees of fundamental frequency suitability based on a moving average of the estimated pure-tone amplitudes or a moving standard deviation of the estimated pure-tone amplitudes with respect to each natural frequency of the DJ transform spectrogram;
extracting the fundamental frequency based on local maximum values of the degrees of fundamental frequency suitability for the respective natural frequencies at each of the plurality of time points;
providing, based on the fundamental frequency, a resultant frequency comprising a high measurement precision of least one of: (a) temporal resolution or (b) frequency resolution, and
identifying the input sound or synthesizing an output sound, based on the resultant frequency.

The estimated pure-tone amplitudes may be same as the predicted pure-tone amplitudes.

The degrees of fundamental frequency suitability may be proportional to the moving average of the estimated pure-tone amplitudes or may be inversely proportional to the moving standard deviation of the estimated pure-tone amplitudes.

The extracting the fundamental frequency may include generating a black-and-white spectrogram by extracting the N (N being an integer equal to or greater than 2) topmost degrees of fundamental frequency suitability among the degrees of fundamental frequency suitability at respective time points, setting values corresponding to natural frequencies corresponding to the N degrees of fundamental frequency suitability to "1", and setting remaining values to "0"; generating an average black-and-white spectrogram by calculating an average over each region of the black-and-white spectrogram, where the regions of the black-and-white-spectrogram have the same size containing each point of the black-and-white spectrogram; and extracting the local maximum values in the average black-and-white spectrogram depending on the natural frequencies at the respective time points.

The extracting the fundamental frequency may further include extracting a candidate fundamental frequency based on a difference between natural frequencies corresponding to adjacent local maximum values in the average black-and-white spectrogram depending on the natural frequencies, at respective time points, and a lowest frequency among the natural frequencies corresponding to local maximum values in the average black-and-white spectrogram.

The extracting the fundamental frequency may further include setting a candidate fundamental frequency at a time point, when a moving average of a difference between the candidate fundamental frequencies at the time point and an adjacent time point is smallest among candidate fundamental frequencies at a plurality of time points, to a black-and-white-spectrogram-based fundamental frequency at each time point; and setting a first region including a positive integer multiple of a time average of the black-and-white-spectrogram-based fundamental frequency, set for a predetermined time duration, and setting a value, obtained by dividing a frequency having a highest value in an average black-and-white spectrogram among frequencies belonging to the first region of the average black-and-white spectrogram at a time adjacent to the predetermined time duration by a positive integer (k) corresponding to the first region, to which the frequency having the highest value in the average black-and-white spectrogram belongs among frequencies belonging to the first region, to the black-and-white-spectrogram-based fundamental frequency at the time adjacent to the predetermined time duration.

The extracting the fundamental frequency may further include setting a second region including a positive integer multiple of the black-and-white-spectrogram-based fundamental frequency at each time point and setting a value, obtained by dividing a frequency having a highest degree of fundamental frequency suitability among frequencies of the second region by a positive integer (I) corresponding to the second region to which the frequency having the highest degree of fundamental frequency suitability belongs, to the final fundamental frequency at each time point.

A spectrogram variance corresponding to a lowest frequency may be smaller than spectrogram variances corresponding to other frequencies in a spectrogram of a result obtained by processing the input sound using the method.

Each expected steady-state amplitude may be calculated using an equation $$A_i^{ab}(\omega_{ext}) \simeq \frac{x_i(t=\tau_{n+1}) - x_i(t=\tau_n)e^{-\Gamma_i(\tau_{n+1}-\tau_n)}}{1 - e^{-\Gamma_i(\tau_{n+1}-\tau_n)}}$$

where $A_i^{ab}(\omega_{ext})$ is the expected steady-state amplitude of an ith spring $S_i$ of the plurality of springs, wherein i is a positive integer, $x_i(t=T_n)$ and $x_i(t=T_{n+1})$ indicate amplitudes at two time points ($T_n$ and $T_{n+1}$) having an interval there between equal to one natural period of the spring $S_i$, and $\Gamma_i$ is a damping constant per unit mass of the spring $S_i$.

Each predicted pure-tone amplitude may be calculated using an equation: $F_{ext}(t) \simeq A_i^{ab}(\omega_{ext}) M\Gamma_i \omega_{ext}$ where $F_{ext}(t)$ is the predicted pure-tone amplitude, $A_i^{ab}(\omega_{ext})$ is the expected steady-state amplitude of an ith spring $S_i$ of the plurality of springs, wherein i is a positive integer, M indicates a mass of an object fixed to an end of the spring $S_i$, $\Gamma_i$ is a damping constant per unit mass of the spring $S_i$, and $\omega_{ext}$ is an angular velocity of the input sound.

The calculating the estimated pure-tone amplitudes may include calculating the predicted pure-tone amplitudes; calculating transient-state-pure-tone amplitudes, which are amplitudes of an input sound estimated based on an amplitude during the one natural period of each of the plurality of springs, based on the amplitude during the one natural period of each of the plurality of springs; and calculating filtered pure-tone amplitudes based on values obtained by multiplying the predicted pure-tone amplitudes by the transient-state-pure-tone amplitudes and calculating the estimated pure-tone amplitudes based on the calculated filtered pure-tone amplitudes.

Each transient-state-pure-tone amplitude may be calculated using an equation: $F_{i,t}(t) \simeq A_{i,t}^{ab}(\omega_{ext}) M\Gamma_i \omega_{ext}$ where $F_{i,t}(t)$ is the transient-state-pure-tone amplitude of an ith spring $S_i$ of the plurality of springs, wherein i is a positive integer, $A_{i,t}^{ab}(\omega_{ext})$ is a maximum value of a displacement during one natural period of the spring $S_i$ at time t, M indicates a mass of an object fixed to an end of the spring $S_i$, $\Gamma_i$ is a damping constant per unit mass of the spring $S_i$, and $\omega_{ext}$ is an angular velocity of the input sound.

In accordance with the present disclosure, the above and other objects can be accomplished by the provision of a non-transitory computer-readable recording medium having recorded thereon instructions that when performed by a computer, cause the computer to:

generate a DJ transform spectrogram indicating estimated pure-tone amplitudes for respective frequencies corresponding to natural frequencies of a plurality of springs and a plurality of time points by modeling an oscillation motion of the plurality of springs having different natural frequencies, with respect to an input sound, and calculating the estimated pure-tone amplitudes for the respective natural frequencies, wherein generating the DJ transform spectrogram includes:

estimating expected steady-state amplitudes, each of which is a convergence value of an amplitude of each of the plurality of springs in a steady state, based on amplitudes at two time points having an interval therebetween equal to one natural period of each of the plurality of springs, and calculating the estimated pure-tone amplitudes based on predicted pure-tone amplitudes that are amplitudes of the input sound estimated based on the expected steady-state amplitudes;

calculate degrees of fundamental frequency suitability based on a moving average of the estimated pure-tone amplitudes or a moving standard deviation of the estimated pure-tone amplitudes with respect to each natural frequency of the DJ transform spectrogram;

extract the fundamental frequency based on local maximum values of the degrees of fundamental frequency suitability for the respective natural frequencies at each of the plurality of time points;

provide, based on the fundamental frequency, a resultant frequency comprising a high measurement precision of least one of: (a) temporal resolution or (b) frequency resolution, and identify the input sound or synthesize an output sound, based on the resultant frequency.

Exemplary embodiments of the present disclosure provide a sound processing method capable of realizing a high measurement precision.

DETAILED DESCRIPTION

Reference will now be made in detail to the exemplary embodiments of the present disclosure, examples of which are illustrated in the accompanying drawings.

Figure 1:
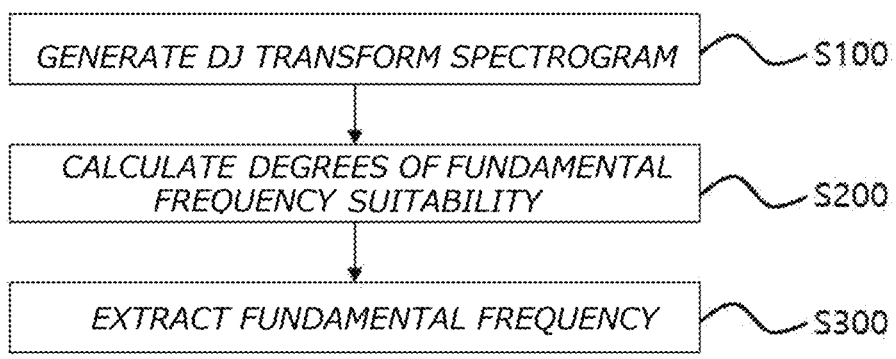
FIG. 1 is a flowchart showing a sound processing method according to an embodiment of the present disclosure.

FIG. 1 is a flowchart showing a sound processing method according to an embodiment of the present disclosure.

Referring to FIG. 1, the sound processing method according to an embodiment of the present disclosure may include: generating a DJ transform spectrogram indicating estimated pure-tone amplitudes for respective natural frequencies of a plurality of springs and a plurality of time points by performing DJ transform of modeling an oscillation motion of the plurality of springs having different natural frequencies with respect to an input sound and calculating the estimated pure-tone amplitudes (S100); calculating degrees of fundamental frequency suitability based on a moving average of the estimated pure-tone amplitudes or a moving standard deviation of the estimated pure-tone amplitudes with respect to each natural frequency of the DJ transform spectrogram (S200); and extracting a fundamental frequency based on local maximum values of the degrees of fundamental frequency suitability for the respective natural frequencies at each time point (S300).

With regard to the generation of the DJ transform spectrogram, the DJ transform will be first described. The DJ transform in the case in which a sound having one frequency (angular velocity) is input will be described, and based thereon, the DJ transform in the case in which a sound having various frequencies (angular velocities) is input will be described.

The DJ transform may be configured by modeling a oscillation motion of a plurality of springs having different natural frequencies and may be used for appropriately showing the characteristic of an actual sound by mimicking a motion of hair cells in the cochlea of the ear through the oscillation motion of the springs. Since it is possible to easily convert a frequency into an oscillation frequency or an angular velocity, they are interchangeably referred to throughout this specification.

A plurality of springs may be assumed to have different natural frequencies. The natural frequencies of the plurality of springs may have a predetermined frequency interval, for example, 1 Hz, 2 Hz, or 10 Hz in a frequency range corresponding to a sound, that is, a human audible frequency range between 20 Hz and 20 KHz.

The following equation may be an equation of motion for a displacement $x_i(t)$ from an equilibrium position of an object having a mass M and fixed to one end of a spring $s_i$ having a spring constant $k_i$ with respect to an external force $F(t)$.

$$\frac{d^2 x_i}{dt^2} + \Gamma_i \frac{dx_i}{dt} + \omega_{oi}^2 x_i = \frac{1}{M} F(t) \qquad \text{(Equation 1)}$$

Here, when $\omega_{oi}$ is an intrinsic resonance angular velocity and satisfies $$\omega_{0i} = \sqrt{\frac{k_i}{M}}$$

and a damping ratio is $\xi$, $\Gamma_i$ may be a damping constant per unit mass and may satisfy $\Gamma_i \simeq 2\xi\omega_{0i}$ In the model, M=1 and $\xi$=0.001 may be used, and these values may be varied in the future in order to improve performance.

First, it may be assumed that an angular velocity is $\omega_{ext}$ and an external sound $F(t)=F_{ext}\cos(\omega_{ext}t)$ of a predetermined amplitude $F_{ext}$ is input. In this case, a solution $x_i(t)$ of an equation of motion of a spring having a stop state as an initial condition may be represented as follows.

$$x_i(t) = \qquad \text{(Equation 2)}$$
$$A_i^{el}(\omega_{ext})\left[\cos(\omega_{ext}t) - e^{-0.5\Gamma_i t}\cos(\omega_i t) - \frac{1}{2}\frac{\Gamma_i}{\omega_i}e^{-0.5\Gamma_i t}\sin(\omega_i t)\right] +$$
$$A_i^{ab}(\omega_{ext})\left[\sin(\omega_{ext}t) - \frac{\omega_{ext}}{\omega_i}e^{-0.5\Gamma_i t}\sin(\omega_i t)\right]$$

Here, $\omega_i = \omega_{0i}\sqrt{1-\xi^2}$ may be satisfied, and in the model, if I uses a very small value, for example, about 0.001, $\omega_i \simeq \omega_{0i}$ may be satisfied. $A_i^{ab}(\omega_{ext})$ and $A_i^{el}(\omega_{ext})$ may be represented as follows.

$$A_i^{ab}(\omega_{ext}) = \frac{F_{ext}}{M}\frac{\Gamma_i\omega_{ext}}{[(\omega_{0i}^2 - \omega_{ext}^2)^2 + \Gamma_i^2\omega_{ext}^2]} \qquad \text{(Equation 3)}$$

$$A_i^{el}(\omega_{ext}) = \frac{F_{ext}}{M}\frac{(\omega_{0i}^2 - \omega_{ext}^2)}{[(\omega_{0i}^2 - \omega_{ext}^2)^2 + \Gamma_i^2\omega_{ext}^2]} \qquad \text{(Equation 4)}$$

When the angular velocity $\omega_{ext}$ of an external force and the angular velocity $\omega_{0i}$ of a natural frequency of a spring are identical to each other, $A_i^{ab}(\omega_{ext})$ and $A_i^{el}(\omega_{ext})$ may be represented as follows.

$$A_i^{ab}(\omega_{ext}) = \frac{F_{ext}}{M}\frac{1}{\Gamma_i\omega_{ext}} \qquad \text{(Equation 5)}$$

$$A_i^{el}(\omega_{ext}) = 0 \qquad \text{(Equation 6)}$$

A spring that satisfies a condition in which the angular velocity $\omega_{0i}$ of the natural frequency of the spring used in the DJ transform is $\omega_{ext} = \omega_i = \omega_{0i}$ if the external sound has the angular velocity $\omega_{ext}$ may be referred to as a spring in a resonance condition. In this case, $A_i^{ab}(\omega_{ext}) \simeq 0$ is satisfied, and thus the displacement $x_i(t)$ of the spring may be represented as follows.

$$x_i(t) \simeq A_i^{ab}(\omega_{ext})(1-e^{-0.5\Gamma_i t})\sin(\omega_i t) \qquad \text{(Equation 7)}$$

In Equation 7, the value $A_i^{ab}(\omega_{ext})$ at $\omega_{ext} = \omega_i$ is almost the same as a value $F_{ext}/(M\Gamma_i\omega_{ext})+\omega_{ext}=\omega_{0i}$ at of Equation 5, and thus they may be taken as the same value to develop the equation.

$T_n$ may be defined to be $(2n\pi+\pi/2)/\omega_i$. If Equation 7 is observed at time $t=T_n$, that is, the time at which the displacement $x_i(t)$ is the maximum in one cycle, a value of $x_i(t=T_n)$ may be briefly represented as follows.

$$x_i(t=\tau_n) \simeq A_i^{ab}(\omega_{ext})(1-e^{-0.5\Gamma_i T_n}) \qquad \text{(Equation 8)}$$

According to Equation 8, after a sufficient time elapses (n→∞), the displacement $x_i(t=T_n)$ in a stabilized state may converge to the value $A_i^{ab}(\omega_{ext})$.

At the time before the sufficient time elapses and the displacement $x_i(t=T_n)$ in the stabilized state converges after an external sound begins to be input, the convergence value $A_i^{ab}(\omega_{ext})$ of the displacement $x_i(t)$ in the stabilized state after the sufficient time elapses may be calculated. A calculation procedure will be described below.

First, Equation 8 may be transformed as follows.

$$\left(\frac{x_i(t=\tau_n)}{A_i^{ab}(\omega_{ext})} - 1\right) \simeq -e^{-0.5\Gamma_i \tau_n} \quad \text{(Equation 9)}$$

If the value of n in Equation 9 is changed to n+1, Equation 9 may be transformed as follows.

$$\left(\frac{x_i(t=\tau_{n+1})}{A_i^{ab}(\omega_{ext})} - 1\right) \simeq -e^{-0.5\Gamma_i \tau_{n+1}} \quad \text{(Equation 10)}$$

If both sides of Equation 9 are divided by both sides of Equation 10, respectively, the following equation may be obtained.

$$A_i^{ab}(\omega_{ext}) \simeq \frac{x_i(t=\tau_{n+1}) - x_i(t=\tau_n)e^{-\Gamma_i(\tau_{n+1}-\tau_n)}}{1 - e^{-\Gamma_i(\tau_{n+1}-\tau_n)}} \quad \text{(Equation 11)}$$

As seen from Equation 11, if $\omega_{ext}=\omega_i \simeq \omega_{0i}$ and values of $x_i(t=T_n)$ and $x_i(t=T_{n+1})$ are known, the convergence value of the displacement $x_i(t)$ in the stabilized state after a sufficient time elapses, that is, an expected steady-state amplitude $A_i^{ab}(\omega_{ext})$, may be estimated. The amplitude, $F_{ext}(t)$, of an external sound at this time point may be calculated as follows using the estimated value $A_i^{ab}(\omega_{ext})$ obtained at this time point and Equation 5.

$$F_{ext}(t) \simeq A_i^{ab}(\omega_{ext})M\Gamma_i\omega_{ext} \quad \text{(Equation 12)}$$

Throughout this specification, the amplitude, $F_{ext}(t)$, of the external sound, calculated based on the convergence value $A_i^{ab}(\omega_{ext})$ of the displacement $x_i(t)$ in the stabilized state, is referred to as a predicted pure-tone amplitude.

Equation 11, representing the expected steady-state amplitude, may be derived from Equation 7, stating a motion of the spring in a resonance condition. Thus, if Equation 12 is calculated using the displacement $x_i(t)$ for each spring prior to determination of whether the spring resonates, the predicted pure-tone amplitude of a natural frequency of a spring that does not satisfy the resonance condition may also have a great value. Accordingly, the following operation may be performed.

Assuming that a displacement of a spring is the displacement in the stabilized state, the amplitude $A_i^{ab}(\omega_{ext})$ of the spring at this time point may be determined to be the maximum value of the displacement $x_i(t)$ during one natural cycle of each spring. With reference to Equation 12, a transient-state-pure-tone amplitude $F_{i,t}(t)=A_{i,t}^{ab}(\omega_{ext})M\Gamma_i\omega_{ext}$ may be calculated.

A value obtained by multiplying the transient-state-pure-tone amplitude $F_{i,t}(t)$ as calculated above by the predicted pure-tone amplitude $F_{ext}(t)$ will be referred to as a filtered pure-tone amplitude $F_{i,p}(t)=F_{i,t}(t) \times F_{ext}(t)$. A filtered pure-tone amplitude may have a characteristic in which, if a spring that resonates with an external sound is compared with a spring that does not resonate therewith, the difference in the amplitude therebetween is high, and if the external sound disappears, the amplitude rapidly converges to 0.

In the specification, the estimated pure-tone amplitudes may indicate the DJ transform result obtained by modeling an oscillation motion of a plurality of springs having different natural frequencies, may be any amplitude among the predicted pure-tone amplitude, the filtered pure-tone amplitude, and the expected steady-state amplitude, and in detail may be the predicted pure-tone amplitude or the filtered pure-tone amplitude.

Hereinafter, it may be assumed that a harmonic wave including n frequencies that are positive integer multiples of the fundamental frequency $f_0$ is input. In this case, a set W of angular velocities of the harmonic wave may be represented as follows.

$W=\{\omega_i|\omega_i=i\times 2\pi f_0, \text{i being positive integer depending on input harmonic wave}\}$ (Equation 13)

Elements of the set W may be sequentially ordered from the smallest and may then be represented as follows.

$W=\{\omega_{ext,1}, \omega_{ext,2}, \omega_{ext,3}, \ldots, \omega_{ext,n}\}$ (Equation 14)

The harmonic wave may be represented by $$F(t) = \sum_{j=0}^{n} F_{ext,j}\cos(\omega_{ext,j}t).$$

If a harmonic wave F(t) is input, the displacement $x_i(t)$ of the spring may be represented as follows by the sum of spring displacements for respective angular velocities included in the frequency set W.

$$x_i(t) = \sum_{j=1}^{n} A_{i,j}^{el}(\omega_{ext,j})[\cos(\omega_{ext,j}t) - \quad \text{(Equation 15)}$$
$$e^{-0.5\Gamma_i t}\cos(\omega_{0i}t) - \frac{1}{2}\frac{\Gamma_i}{\omega_{0i}}e^{-0.5\Gamma_i t}\sin(\omega_{0i}t)\Big] +$$
$$\sum_{j=1}^{n} A_{i,j}^{ab}(\omega_{ext,j})\left[\sin(\omega_{ext,j}t) - \frac{\omega_{ext,j}}{\omega_{0i}}e^{-0.5\Gamma_i t}\sin(\omega_{0i}t)\right]$$

Here, $A_{i,j}^{ab}(\omega_{est})$ and $A_{i,j}^{el}(\omega_{ext})$ may be represented as follows.

$$A_{i,j}^{ab}(\omega_{ext,j}) = \frac{F_{ext,j}}{M}\frac{\Gamma_i\omega_{ext,j}}{\left[(\omega_{0i}^2-\omega_{ext,j}^2)^2 + \Gamma_i^2\omega_{ext,j}^2\right]} \quad \text{(Equation 16)}$$

$$A_{i,j}^{el}(\omega_{ext,j}) = \frac{F_{ext,j}}{M}\frac{(\omega_{0i}^2-\omega_{ext,j}^2)}{\left[(\omega_{0i}^2-\omega_{ext,j}^2)^2 + \Gamma_i^2\omega_{ext,j}^2\right]} \quad \text{(Equation 17)}$$

If the displacement $x_i(t)$ is observed in the direction in which the angular velocity $\omega_{0i}$ of the natural frequency of the spring increases (or decreases), springs in a resonance condition, which resonate with each of the elements of the set w of the angular velocity included in the harmonic wave, may be found. When the displacement $x_i(t)$ is observed for an arbitrary short time duration, the maximum value of the displacement $x_i(t)$ of the spring in the resonance condition may be greater than the maximum value of the displacement $x_i(t)$ of a spring that is not in the resonance condition, which is immediately adjacent to the spring in the resonance condition based on a unique angular velocity of the spring, according to Equations 15, 16, and 17. Accordingly, if the DJ transform spectrogram is generated using Equations 11 and 12 based on the maximum values for respective natural frequencies of springs having the displacement $x_i(t)$ of a spring, angular velocity values at points where local maximum values are observed at a specific time point may correspond one to one with the elements of the set W of the angular velocities of the harmonic wave.

That is, the displacement $x_i(t)$ of the spring represented by Equations 15 to 17 may be determined by modeling the oscillation motion of the spring, and the estimated pure-tone amplitude when a sound having various frequencies is input may be calculated by applying Equations 11 and 12 to the displacement $x_i(t)$ of the spring. Accordingly, the DJ transform spectrogram based on the estimated pure-tone amplitude may be generated by displaying the estimated pure-tone amplitude in a space defined by a time axis and a frequency axis corresponding to a resonance frequency of the spring.

In this regard, the displacement $x_i(t)$ corresponding to one local maximum value of the spectrogram may be greatly affected by a sound in a resonance condition among sounds having angular velocities included in the harmonic wave, but as seen from Equations 15, 16, and 17, the displacement $x_i(t)$ may also be affected by a sound having each of the angular velocities, which is not in a resonance condition. If the harmonic wave is given, a rate of change in an amplitude of the displacement $x_i(t)$ of the spring $s_i$ in a resonance condition in which the angular velocity $\omega_{0i}$ of the natural frequency resonates with $\omega_{ext,m}$, that is, $\omega_{ext,m} \approx \omega_{0i}$ or when a sound of an angular velocity $\omega_{ext,n}$, which is not in a resonance condition, that is, $\omega_{ext,m} \neq \omega_{0i}$ is input may be estimated using the following equation.

$$\left| \frac{A_{i,n}^{el}(\omega_{ext,n})}{A_{i,m}^{ab}(\omega_{ext,m})} \right| = \frac{F_{ext,n}}{F_{ext,m}} \frac{2\zeta}{|1 - (k/m)^2|} \ll 1 \quad \text{(Equation 18)}$$

As seen from Equations 16 and 17, $A_{i,m}^{ab}(\omega_{ext,m}) \gg A_{i,m}^{el}(\omega_{ext,m})$ may be satisfied near the resonance condition, and $A_{i,n}^{el}(\omega_{ext,n}) \gg A_{i,n}^{ab}(\omega_{ext,n})$ may be satisfied in a condition that greatly deviates from the resonance condition. Equation 18 represents the result obtained by selecting and comparing only greater values among these values. As seen from Equation 18, when values of $F_{ext,n}$ and $F_{ext,m}$ are not greatly different, if $\zeta=0.001$, the effect of the term $A_{i,m}^{ab}(\omega_{ext,m})$ may be much higher than that of $A_{i,n}^{el}(\omega_{ext,n})$. An effect of a frequency that is not in a resonance condition in the harmonic wave may not be enough to change the locations of the local maximum values caused by the resonance condition. Accordingly, the local maximum values may be observed in the DJ transform spectrogram at the locations of the frequencies included in the harmonic wave.

Hereinafter, the relationship between frequencies included in the harmonic wave and a maximum value of the displacement $x_i(t)$ of the spring, which is in a resonance condition to one of the frequencies, will be described. In the DJ transform, a maximum value of the displacement $x_i(t)$ of the spring, which resonates with the fundamental frequency $f_0$, may be calculated at a period of $1/f_0$. An frequency $f_j$, which is not a fundamental frequency, but included in the harmonic wave, may affect the maximum value of the displacement $x_i(t)$ of the spring, but a period $1/f_j$ of the frequency $f_j$ may be a divisor of $1/f_0$, and thus when the maximum value is calculated at a period $1/f_0$, the behavior of the maximum value with respect to time may have a periodic characteristic. In the DJ transform, a maximum value of the displacement $x_i(t)$ of the spring in the resonance condition to $f_j$, which is not the fundamental frequency, may also be calculated at a period $1/f_j$. Because a period in a section affected by $f_0$ may be $1/f_0$ ($1/f_0 > 1/f_j$), when a maximum value of the displacement $x_i(t)$ of the spring, which does not resonate with the fundamental frequency $f_0$, is calculated at a period of $1/f_j$, the amplitude of the fundamental frequency $f_0$ may not be uniform at time points of the period of $1/f$ so that the maximum value of the displacement $x_i(t)$ of the spring may not have a periodic characteristic.

Accordingly, since the periodic characteristic of the maximum value of the displacement $x_i(t)$ related to $f_0$ may be maintained, an oscillation amplitude of the value may be small, and since the periodic characteristic of the maximum value of the displacement $x_i(t)$ related to $f_i$ may not be maintained, the oscillation amplitude of the value may be large. The characteristic of the maximum value of the displacement $x_i(t)$ may be applied without change to the amplitude of the spectrogram based on the estimated pure-tone amplitude, calculated using the maximum value of the displacement $x_i(t)$ and using Equations 11 and 12. Accordingly, when a standard deviation of the amplitude of the spectrogram is calculated, the standard deviation may be small in a section related to $f_0$ and may be great in a section related to $f_i$.

In summary, it may be seen that, for a given harmonic wave, when the amplitude of the spectrogram of a fundamental frequency of a spring that resonates with fundamental frequencies of the harmonic wave is measured, the spring that resonates with the fundamental frequencies of the harmonic wave has 1) a small variance of the amplitude over time and 2) a great maximum value of the amplitude.

Based on these characteristics, the degree of fundamental frequency suitability may be calculated based on the moving average of the estimated pure-tone amplitude or the moving standard deviation of the estimated pure-tone amplitude with respect to each natural frequency of the DJ transform spectrogram (S200).

For example, the degrees of fundamental frequency suitability may be proportional to a moving average $M(t, f)$ of a DJ transform spectrogram $S(t, f)$, or may be inversely proportional to a moving standard deviation $\sigma(t, f)$.

$$R(t, f) = \frac{M(t, f)}{\sigma(t, f)} \quad \text{(Equation 19)}$$

$$M(t, f) = \frac{1}{N} \sum_{t=-N/2}^{N/2-1} S(t+1, f) \quad \text{(Equation 20)}$$

$$\sigma(t, f) = \max(\sqrt{V(t, f)}, \varepsilon) \quad \text{(Equation 21)}$$

$$V(t, f) = \frac{1}{N} \sum_{t=-N/2}^{N/2-1} [S(t+1, f) - M(t, f)]^2 \quad \text{(Equation 22)}$$

Here, N may be an integer, and $\varepsilon$ may be a very small value that is greater than 0. For example, & may be $\zeta(t) = \max(S(t,f)) \times 10\text{-}12$ at time t.

In order to reduce an effect of a small amplitude in the spectrogram, if $M(t,f) < 0.1 \times \max_f(S(t,f))$, $M(t,f) = \beta \times \max_f(S(t,f))$ may be satisfied. Here, $\beta$ may be a small value, and $\beta = 10^{-12}$ may be used.

In some embodiments, $$R(t, f) = \frac{1}{\sigma(t, f)} \text{ or } R(t, f) = M(t, f) \quad (5)$$

may also be used, instead of Equation 19.

Then, a fundamental frequency may be extracted based on the local maximum values of the degrees of fundamental frequency suitability of natural frequencies at each time point (S300).

In some embodiments, the fundamental frequency may be extracted as the lowest value among frequencies corresponding to the local maximum values of the degrees of fundamental frequency suitability depending on the natural frequencies at each time point.

Figure 2:
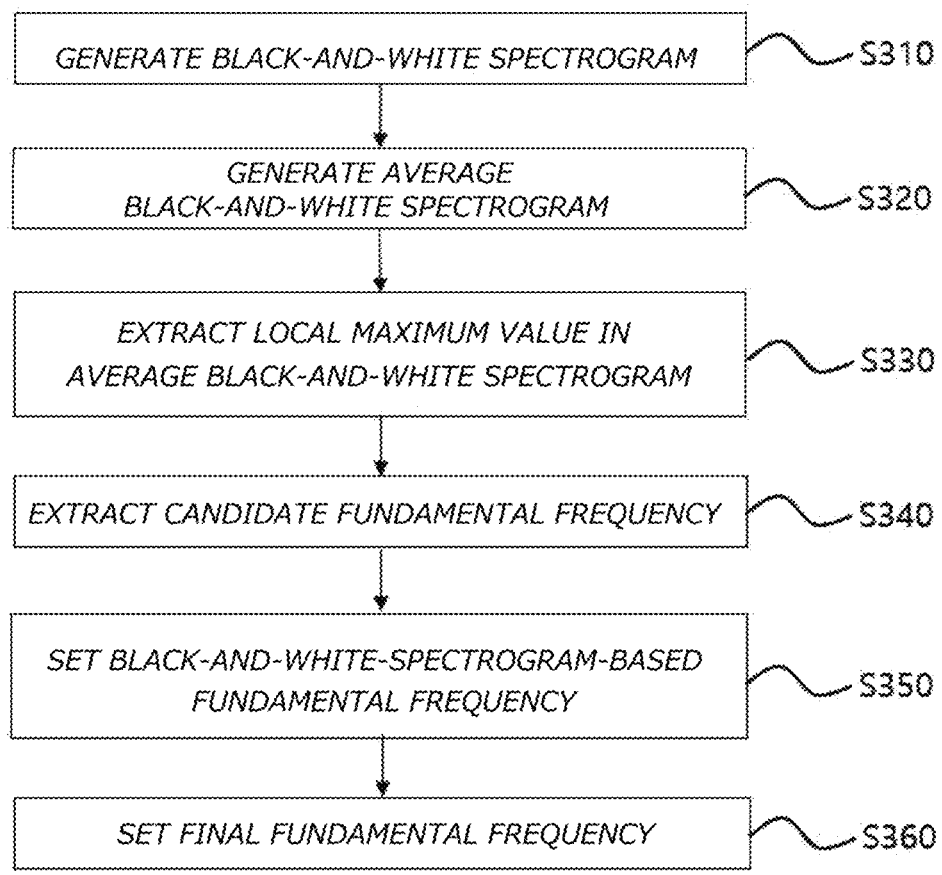
FIG. 2 is a flowchart showing an example of a fundamental frequency extraction operation of FIG. 1.

FIG. 2 is a flowchart showing an example of the fundamental frequency extraction operation S300 of FIG. 1.

Referring to FIG. 2, in order to eliminate the effect of noise and improve accuracy, the fundamental frequency extraction operation S300 may include: a black-and-white spectrogram generation operation S310; an average black-and-white spectrogram generation operation S320; operation S330 of extracting a local maximum value in the average black-and-white spectrogram; a candidate fundamental frequency extraction operation S340; a black-and-white-spectrogram-based fundamental frequency setting operation S350; and a final fundamental frequency setting operation S360.

The fundamental frequency extraction operation S300 does not need to include all of operations S310 to S360, and in some embodiments, may include only some of operations S310 to S360.

In some embodiments, the fundamental frequency extraction operation S300 may include: the black-and-white spectrogram generation operation S310 in which the N (N being an integer equal to or greater than 2) topmost degrees of fundamental frequency suitability are extracted among the degrees of fundamental frequency suitability at the respective time points, values corresponding to natural frequencies corresponding to the N topmost degrees of fundamental frequency suitability are set to "1", and the remaining values are set to "0"; the average black-and-white spectrogram generation operation S320 in which an average over each region of the black-and-white spectrogram is calculated, where the regions of the black-and-white-spectrogram have the uniform size containing each point of the black-and-white spectrogram; and operation S330 of extracting the local maximum value in the average black-and-white spectrogram depending on the natural frequencies at the respective time points.

In the black-and-white spectrogram generation operation S310, the N topmost degrees of fundamental frequency suitability may be extracted from the degrees of fundamental frequency suitability, R (t,f), at time t at which the DJ transform spectrogram is configured. Based on whether a corresponding degree of fundamental frequency suitability is one of the N topmost degrees of fundamental frequency suitability, a black-and-white spectrogram having a value of 0 and 1 may be configured. When each of the degrees of fundamental frequency suitability, R (t,f), is one of the N topmost degrees of fundamental frequency suitability at time t, BW (t,f)=1, and otherwise, BW (t,f)=0.

In the average black-and-white spectrogram generation operation S320, an average over a region may be calculated using the following equation based on each point for respective points included in the black-and-white spectrogram BW (t,f). The result as configured above will be referred to as the average black-and-white spectrogram BW(t,f)

$$\overline{BW}(t, f) = \frac{1}{p \times q} \sum_{i=-p/2}^{p/2-1} \sum_{j=-q/2}^{q/2-1} BW(t+i, f+j) \quad \text{(Equation 23)}$$

In operation S330 of extracting the local maximum value of the average black-and-white spectrogram, greater local maximum values than a given threshold $BW_{th}$ may be extracted among local maximum values along a frequency axis at each time t in the average black-and-white spectrogram. Here, the threshold $BW_{th}$ may be set to a value obtained by multiplying $\max_f BW(t,f)$, which is the maximum value of the local maximum values of BW obtained at each time t, by a predetermined rate $\gamma$ (0≤γ≤1.0). For example, $\gamma$ may be set to 0.2.

That is, the extracted local maximum values may simultaneously satisfy the following conditions.

$$BW(t,f) \geq BW(t,f-1) \quad \text{(Equation 24)}$$

$$BW(t,f) > BW(t,f+1), \quad \text{(Equation 25)}$$

$$BW(t,f) > \gamma \times \max_f BW(t,f), (0 \leq \gamma \leq 1.0) \quad \text{(Equation 26)}$$

The fundamental frequency extraction operation S300 may further include the candidate fundamental frequency extraction operation S340 in which a candidate fundamental frequency is extracted based on both a difference between natural frequencies corresponding to adjacent local maximum values in the average black-and-white spectrogram depending on the natural frequencies at respective time points and the lowest frequency among the natural frequencies corresponding to local maximum values in the average black-and-white spectrogram.

A frequency corresponding to a kth local maximum value in the result, which is obtained by aligning the local maximum values extracted from the average black-and-white spectrogram at time t in ascending order of frequency, will be referred to as f(t,k). An interval d(t,k) between adjacent frequencies may be calculated as follows.

$$d(t,k)=f(t,k+1)-f(t,k) \quad \text{(Equation 27)}$$

Values greater than 0.4×f(t,0) may be selected among values of d(t,k), the lowest value thereamong may be compared with f(t,0), and the smaller value of the lowest value and f(t,0) may be taken as a candidate fundamental frequency $f_0(t)$ at time t. This is based on the observation that there is a high probability that the frequency having the minimum frequency difference with a frequency adjacent thereto, among the frequencies of the harmonic wave present in a sound of a voice or a musical instrument, is the fundamental frequency.

If all frequencies included in the harmonic wave without noise have the same amplitude, d(t,k)=f(t,0) may be satisfied for all values of k.

The fundamental frequency extraction operation S300 may include the black-and-white-spectrogram-based fundamental frequency setting operation S350, and the black-and-white-spectrogram-based fundamental frequency setting operation may include: an operation of setting a candidate fundamental frequency at a time having the smallest moving variance that corresponds to a difference with a candidate fundamental frequency at an adjacent time thereto among candidate fundamental frequencies at a plurality of time points to a black-and-white-spectrogram-based fundamental frequency at the time; and an operation of setting a first region including a positive integer multiple of a time average of the black-and-white-spectrogram-based fundamental frequency, set for a predetermined time duration, and setting a value, obtained by dividing the highest frequency belonging to the first region in the average black-and-white spectrogram at a time adjacent to the predetermined time duration by a positive integer corresponding to the first region, to which the highest frequency belongs, to the black-and-white-spectrogram-based fundamental frequency at the time adjacent to the predetermined time duration.

It may be assumed that the candidate fundamental frequency $f_0(t)$ at each time t is found. First, in order to search for the black-and-white-spectrogram-based fundamental frequency $BF_0(t)$ each time t, the black-and-white-spectrogram-based fundamental frequency $BF_0(t)$ at a specific time to may be calculated. Second, as a time increases from the time to, the black-and-white-spectrogram-based fundamental frequency may be calculated. Third, as a time decreases from the time to, the black-and-white-spectrogram-based fundamental frequency may be calculated.

In a first operation, the time to at which the black-and-white-spectrogram-based fundamental frequency is calculated may be determined as a time having the smallest variance of change over time in the black-and-white spectrogram-based candidate fundamental frequency at each time. A variance V(t) of change in a black-and-white spectrogram-based candidate fundamental frequency at each time t may be calculated using the following equation.

$$V(t) = \frac{1}{N} \sum_{i=-N/1}^{N/2-1} [D(t+i) - \overline{D}(t)]^2 \quad \text{(Equation 28)}$$

$$D(t) = |\hat{f}_o(t+1) - \hat{f}_o(t)| \quad \text{(Equation 29)}$$

$$\overline{D}(t) = \frac{1}{N} \sum_{i=-N/2}^{N/2-1} D(t+i) \quad \text{(Equation 30)}$$

The time to at which V(t) has the smallest value may be $t_0 = \text{argmin}_t(V(t))$, and the fundamental frequency $BF_0(t_0)$ at the time to may be finally determined to be the same value as a candidate fundamental frequency as follows.

$$BF_0(t_0) = f_0(t_0) \quad \text{(Equation 31)}$$

In a second operation, as a time increases from the time to, the black-and-white-spectrogram-based fundamental frequency may be calculated. The black-and-white-spectrogram-based fundamental frequency will be assumed to be calculated from the time $t_0$ to time $t_k$. A set of natural frequencies which include both frequencies, which are near an average frequency, $\overline{BF_0}(k)$, of the $n(>1)$ fundamental frequencies recently calculated along time, and frequencies which are near frequencies of a positive integer multiples of the average frequency, BE (k), will be referred to as H $(t_{k+1})$.

$$H(t_{k+1}) = U_{1 \leq i \leq i_{min}} \{f | f \in [i \times BF_0(k) - \Delta f, i \times BF_0(k) + \Delta f]\} \quad \text{(Equation 32)}$$

Here, $$\overline{BF_0}(t_k) = \frac{1}{\min(k+1, n)} \sum_{i=0}^{\min(k,n-1)} BF_0(t_{k-i}) \quad \text{(Equation 33)}$$

For example, $\Delta f = 20$ Hz, $i_{max} = 5$ may be set.

Let $f_{max}$ be the frequency which is included in the set $H(t_{k+1})$ and, compared to other frequencies in the set $H(t_{k+1})$, has the highest value in the average black-and-white spectrogram. It may be assumed that $f_{max}$ belongs to the frequency domain $[m \times BF_0(k) - \Delta f, m \times BF_0(k) + \Delta f]$ Then, the black-and-white-spectrogram-based fundamental frequency $BF_0(t_{k+1})$ at time $t_{k+1}$ may be calculated using the following equation.

$$BF_0(t_{k+1}) = \frac{f_{max}}{m} \quad \text{(Equation 34)}$$

As k is incremented by one until the time $t_k+1$ becomes the last time of a given spectrogram, the aforementioned second operation may be repeatedly performed.

In a third operation, as a time decreases from the time to, the black-and-white-spectrogram-based fundamental frequency at each time may be calculated until t=0 by performing a procedure similar to the second operation.

Then, the fundamental frequency extraction operation S300 may further include the final fundamental frequency setting operation S360 in which a second region including a positive integer multiple of the black-and-white-spectrogram-based fundamental frequency at an arbitrary time is set, and a value, which is obtained by dividing a frequency having the highest degree of fundamental frequency suitability among frequencies of the second region by a positive integer corresponding to the second region to which the frequency having the highest degree of fundamental frequency suitability belongs, is set to the final fundamental frequency at the arbitrary time.

A final fundamental frequency $f_0(t)$ may be extracted using the black-and-white-spectrogram-based fundamental frequency $BF_0(t)$ at each time t and the aforementioned degrees of fundamental frequency suitability, R(t,f).

A set of frequencies near the black-and-white-spectrogram-based fundamental frequency $BF_0(t)$ at each time t and frequencies of a positive integer multiple of $BF_0(t)$ will be referred to as $H_{BF_0}(t)$ $$H_{BF_0}(t) = \bigcup_{1 \leq i \leq i_{max}} \{f | f \in [i \times BF_0(t) - \Delta f, i \times BF_0(t) + \Delta f]\} \quad \text{(Equation 35)}$$

Here, $\Delta f = 20$ Hz and $i_{max} = 5$ may be set.

It may be assumed that the frequency having the highest degree of fundamental frequency suitability, R (t,f), among frequencies belonging to the set $H_{BF_0}(t)$ at time t is $f_{max}$ and that $f_{max}$ belongs to the frequency domain $[m \times BF_0(t) - \Delta f, m \times BF_0(t) + \Delta f]$. Then, the final fundamental frequency $f_0(t)$ at time t may be calculated using the following equation.

$$f_0(t) = \frac{f_{max}}{m} \quad \text{(Equation 36)}$$

FIGS. 3A-3G are a set of diagrams showing an experimental example of the present disclosure when a sound of a harmonic wave changed over time is input.

Figure 3A:
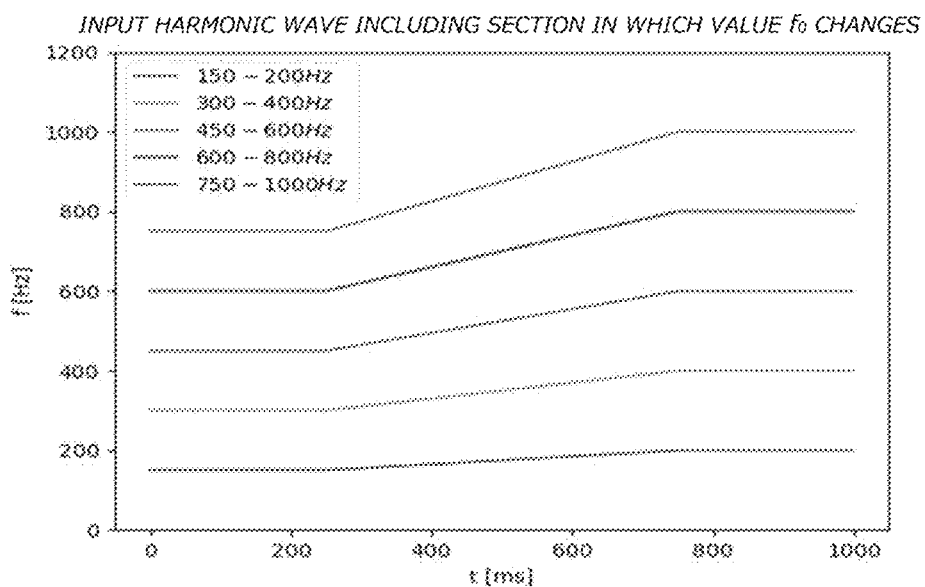
FIGS. 3A-3G to 8A-8B are diagrams showing experimental examples of the present disclosure.
Figure 3B:
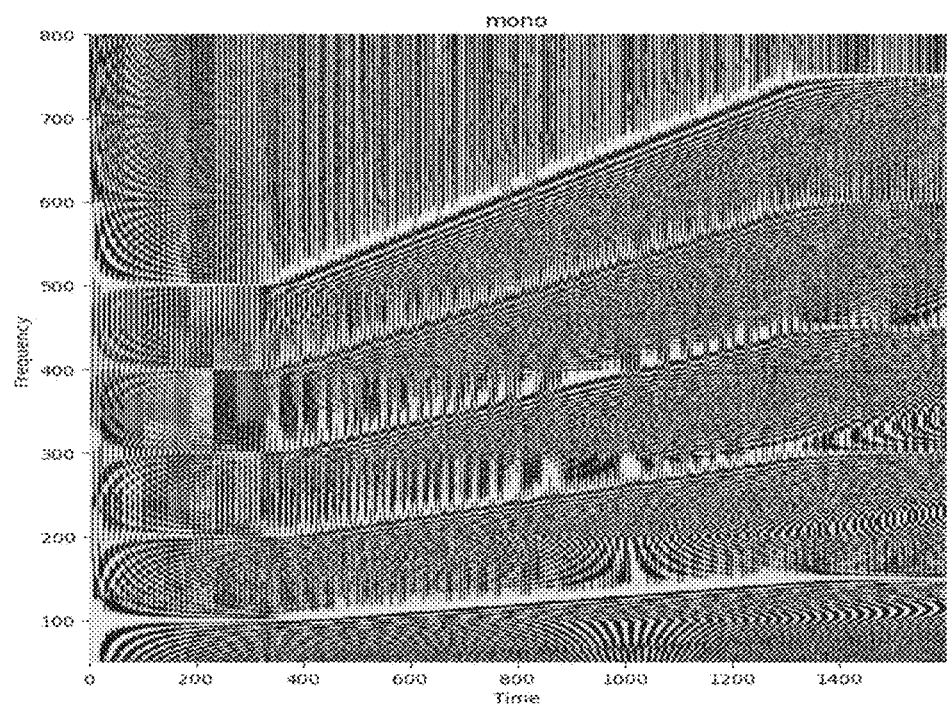
Figure 3C:
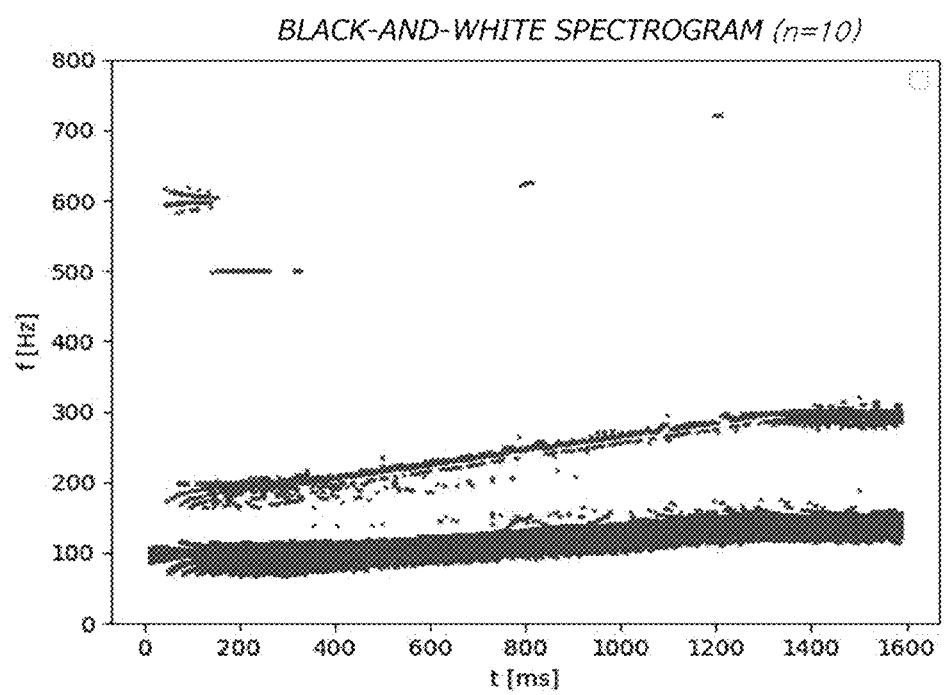
Figure 3D:
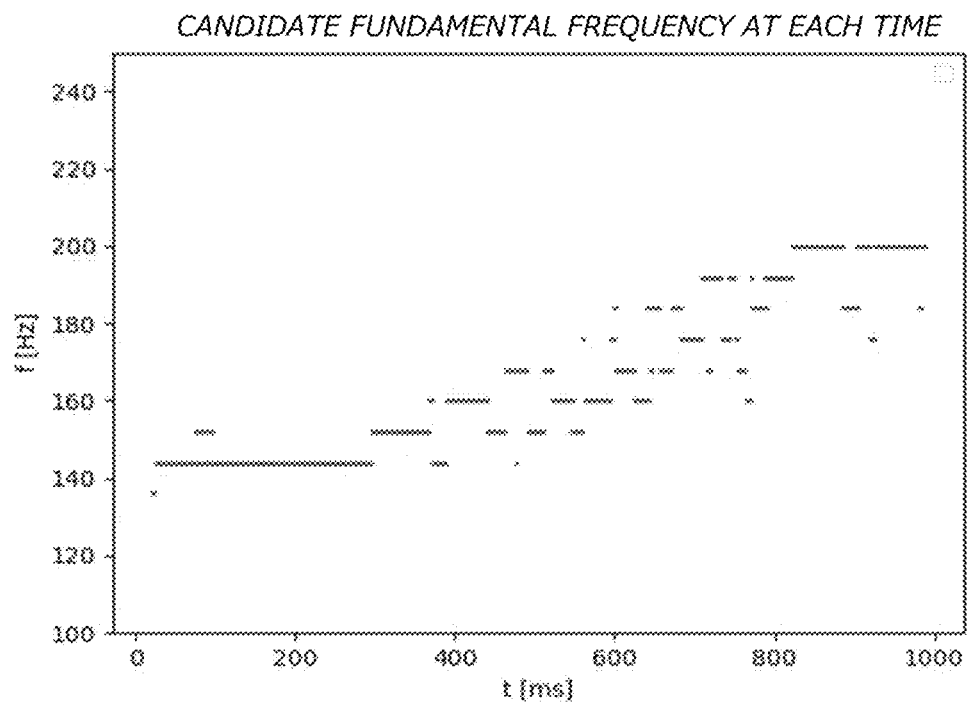
Figure 3E:
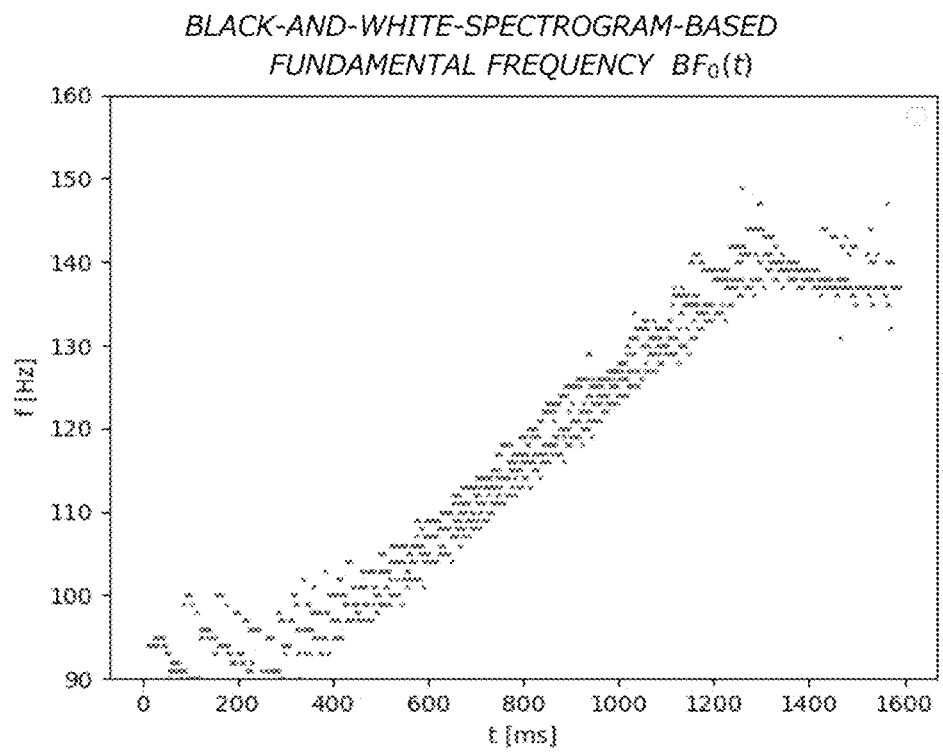
Figure 3F:
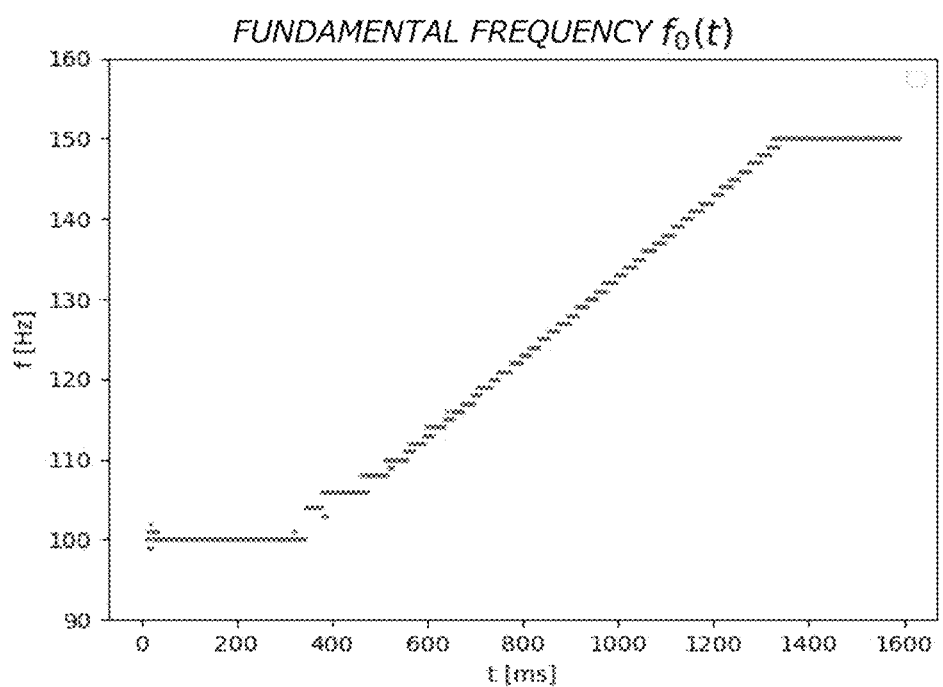
Figure 3G:
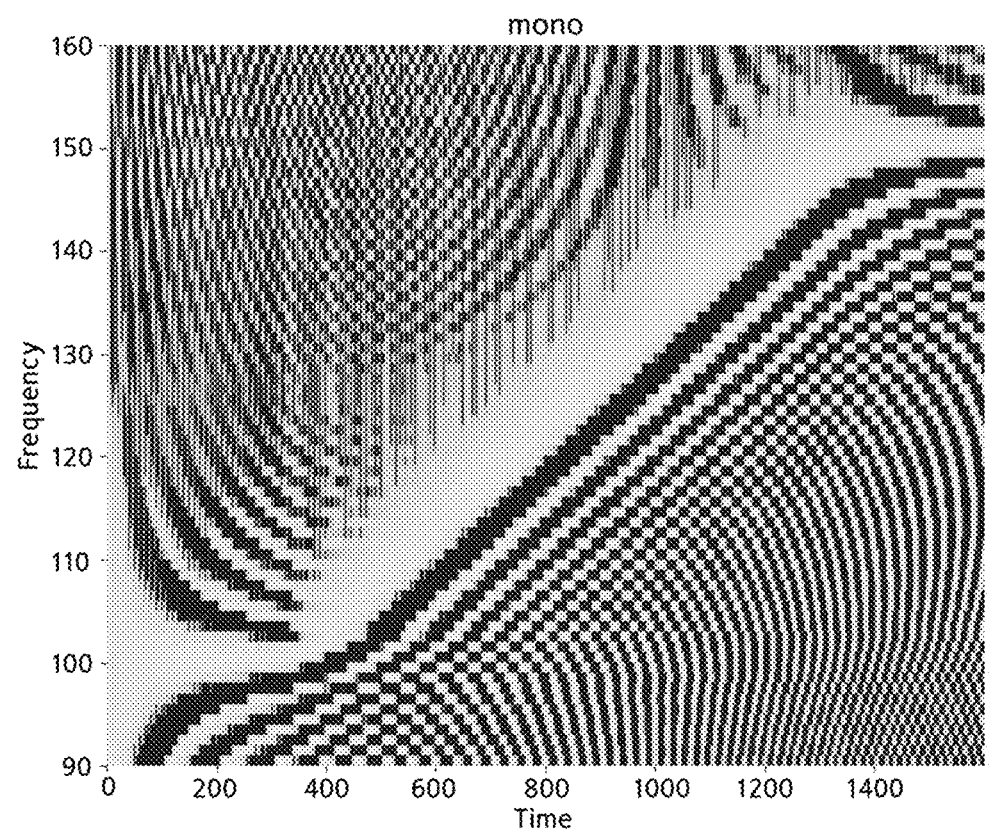

FIG. 3A shows a sound input, FIG. 3B shows a DJ transform spectrogram generated using the sound input of FIG. 3A, FIG. 3C shows a black-and-white spectrogram generated using a degree of fundamental frequency suitability calculated in the DJ transform spectrogram of FIG. 3B after the degree of fundamental frequency suitability is calculated, FIG. 3D shows a candidate fundamental frequency that is selected using a local maximum value along a frequency axis in an average black-and-white spectrogram and frequency values at the locations after the average black-and-white spectrogram is generated using the black-and-white spectrogram of FIG. 3C, FIG. 3E shows a black-and-white-spectrogram-based fundamental frequency generated using the candidate fundamental frequency of FIG. 3D, FIG. 3F shows a final fundamental frequency calculated using the black-and-white-spectrogram-based fundamental frequency of FIG. 3E and the degree of fundamental frequency suitability, and FIG. 3G is a partial enlarged view of FIG. 3B.

As seen from FIGS. 3A to 3G, the final fundamental frequency may be approximately the same as a value corresponding to the fundamental frequency of the sound input.

FIGS. 4A-4G is a set of diagrams showing an experimental example of the present disclosure in which a human voice is input.

Figure 4A:
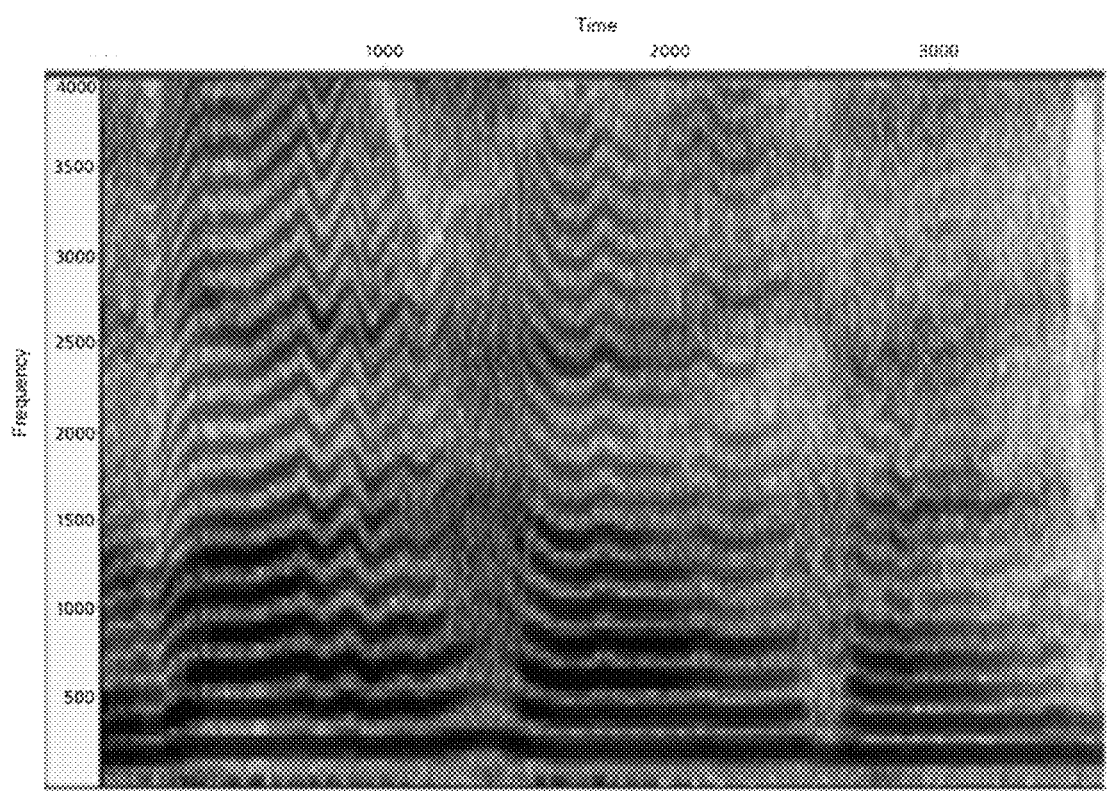
Figure 4B:
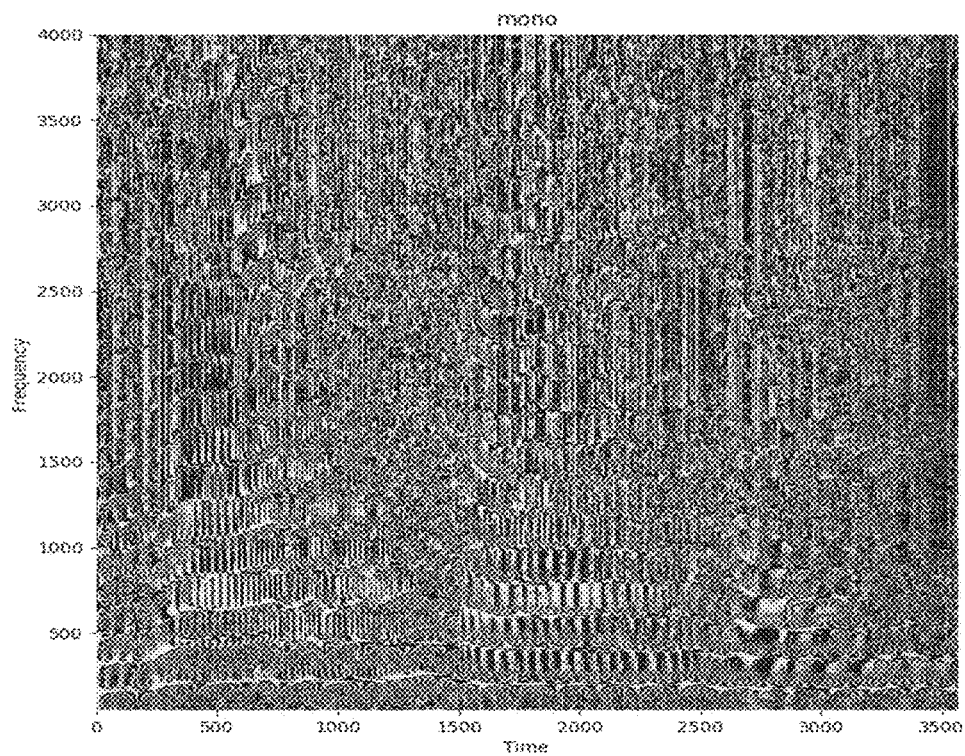
Figure 4C:
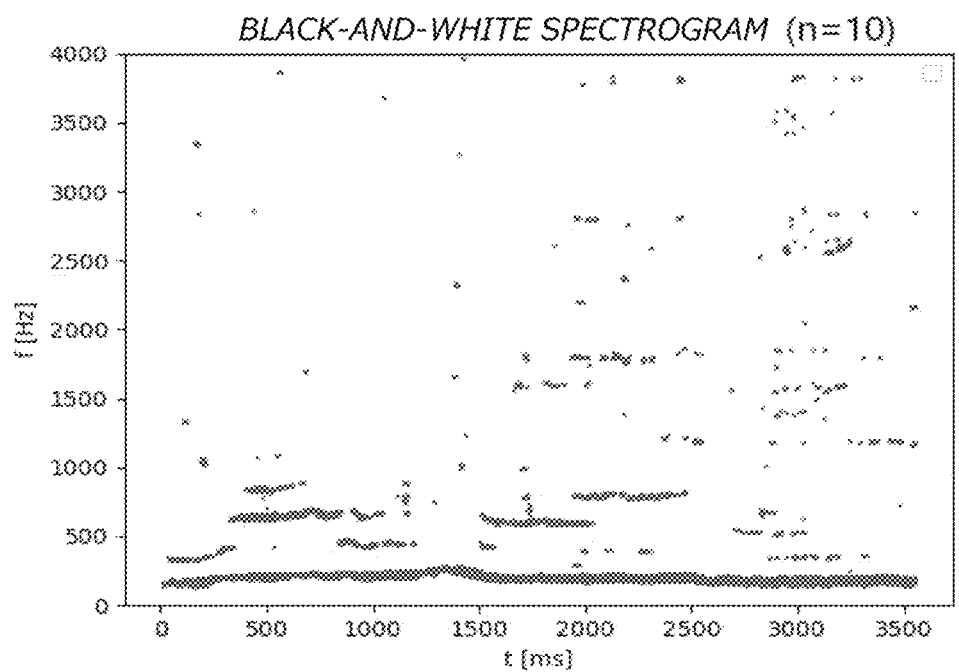
Figure 4D:
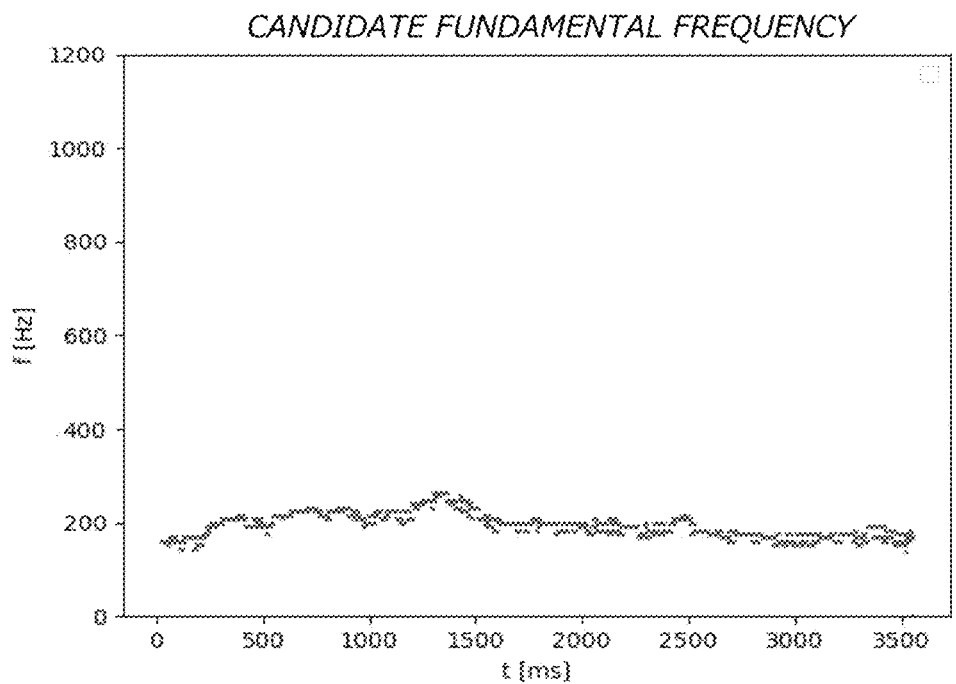
Figure 4E:
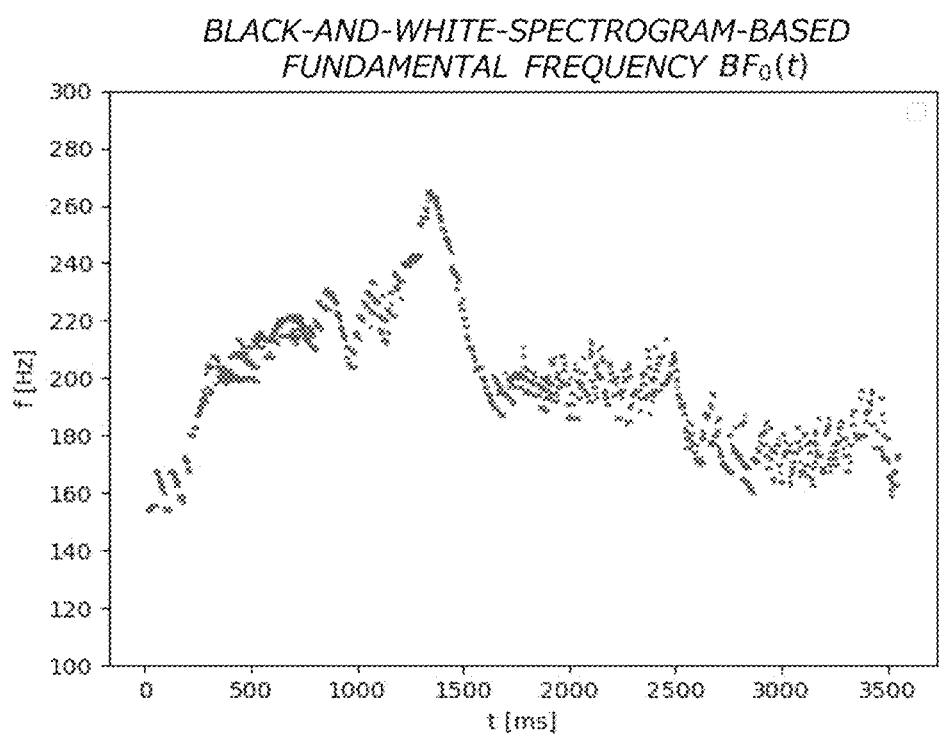
Figure 4F:
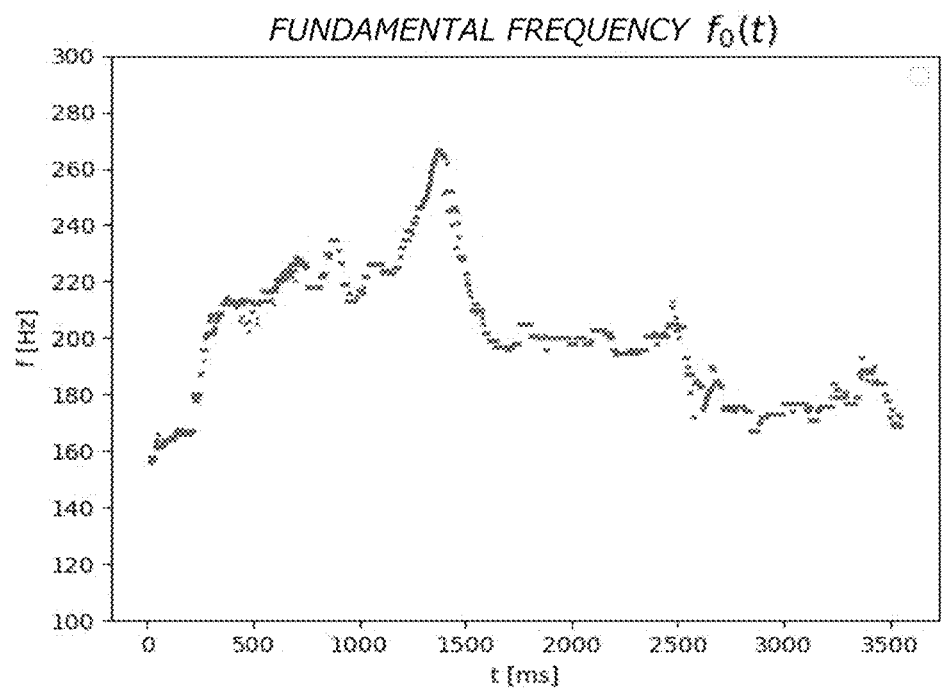
Figure 4G:
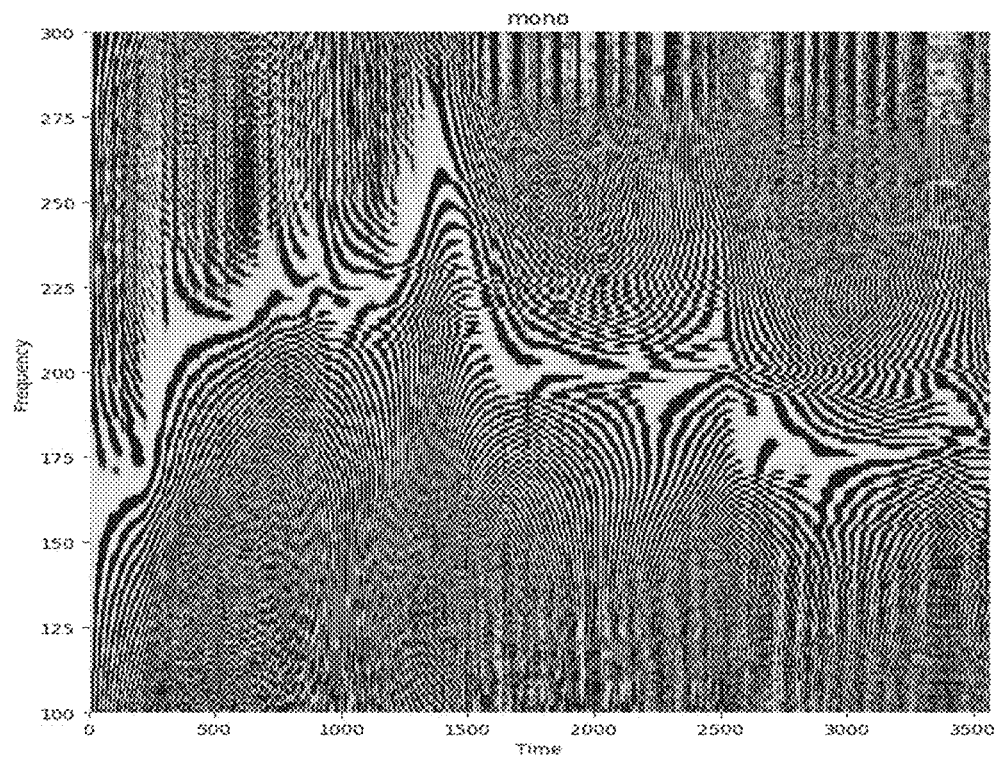

FIG. 4A shows a sound input, FIG. 4B shows a DJ transform spectrogram generated using the sound input of FIG. 4A, FIG. 4C shows a black-and-white spectrogram generated using a degree of fundamental frequency suitability calculated in the DJ transform spectrogram of FIG. 4B after the degree of fundamental frequency suitability is calculated, FIG. 4D shows a candidate fundamental frequency that is selected using a local maximum value along a frequency axis in an average black-and-white spectrogram and frequency values at the locations after the average black-and-white spectrogram is generated using the black-and-white spectrogram of FIG. 4C, FIG. 4E shows a black-and-white-spectrogram-based fundamental frequency generated using the candidate fundamental frequency of FIG. 4D, FIG. 4F shows a final fundamental frequency calculated using the black-and-white-spectrogram-based fundamental frequency of FIG. 4E and the degree of fundamental frequency suitability, and FIG. 4G is a partial enlarged view of FIG. 4B.

As seen from FIGS. 4A to 4G, the final fundamental frequency may be approximately the same as a value corresponding to a fundamental frequency of the sound input.

Figure 5A:
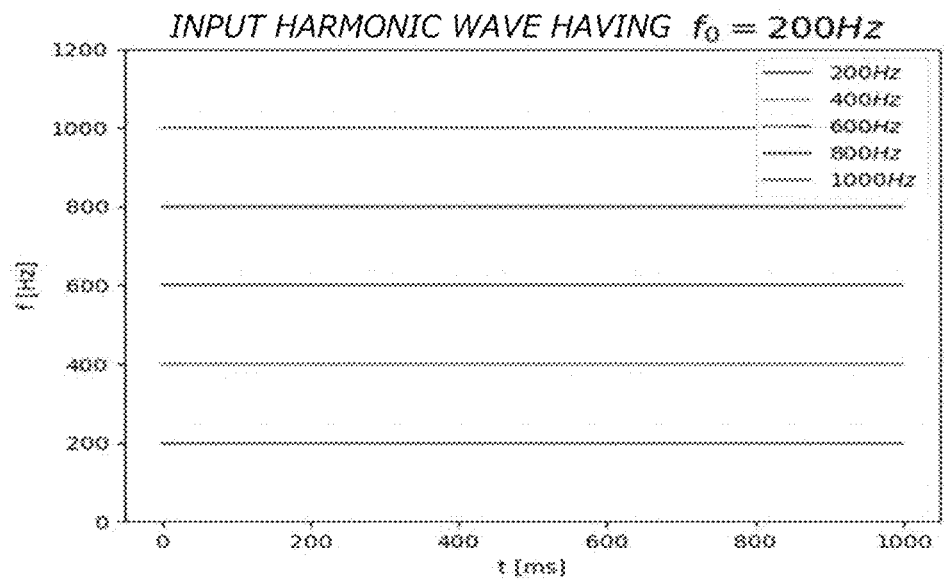
Figure 5B:
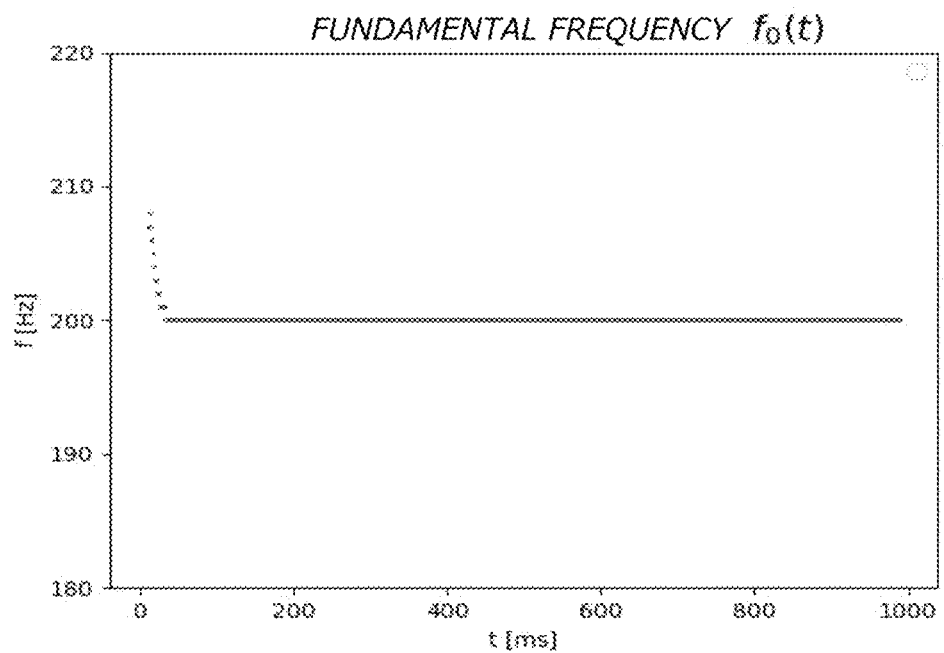

FIG. 5 is a set of diagrams showing a final fundamental frequency when a predetermined harmonic wave sound is input. FIG. 5A shows the case in which a harmonic wave having a fundamental frequency of 200 Hz is input, and FIG. 5B shows a final fundamental frequency obtained using a fundamental frequency extraction method according to an embodiment of the present disclosure.

Figure 6A:
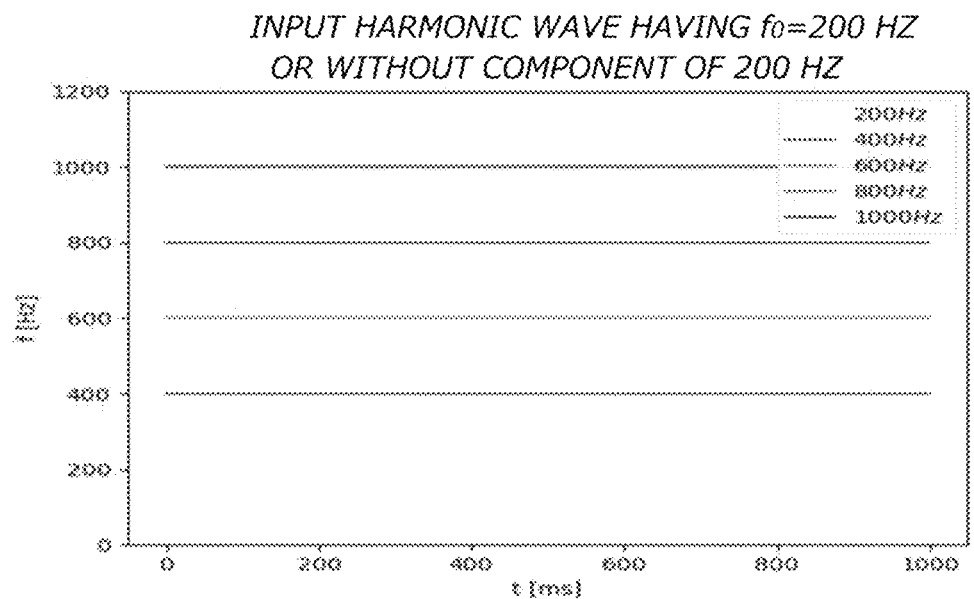
Figure 6B:
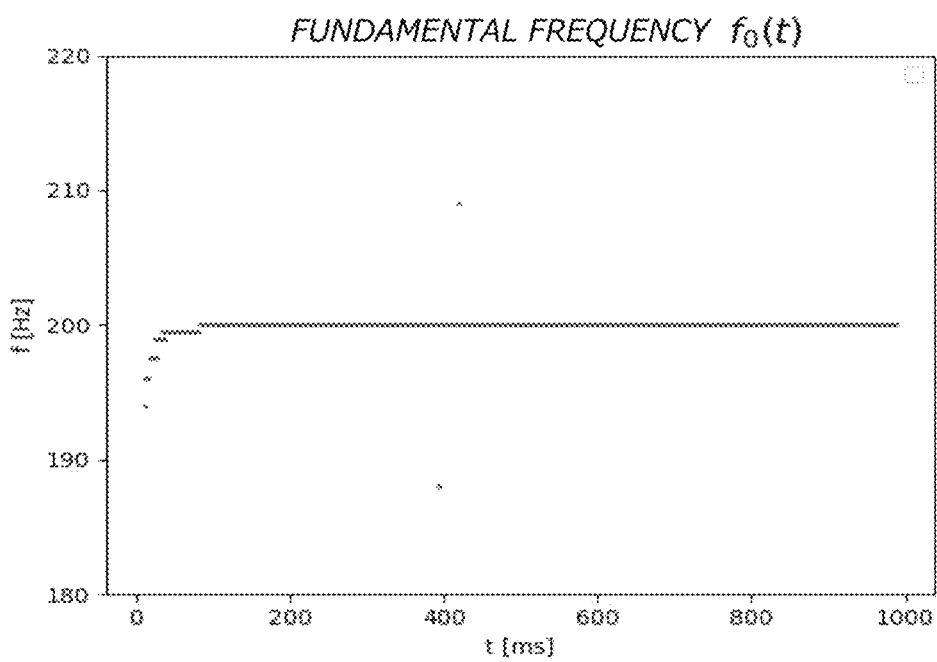

FIG. 6 is a set of diagrams showing a final fundamental frequency when a predetermined harmonic wave sound is input. FIG. 6A shows the case in which a fundamental frequency is 200 Hz but a harmonic wave that does not have the fundamental frequency is input, and FIG. 6B shows a final fundamental frequency obtained using a fundamental frequency extraction method according to an embodiment of the present disclosure.

Figure 7A:
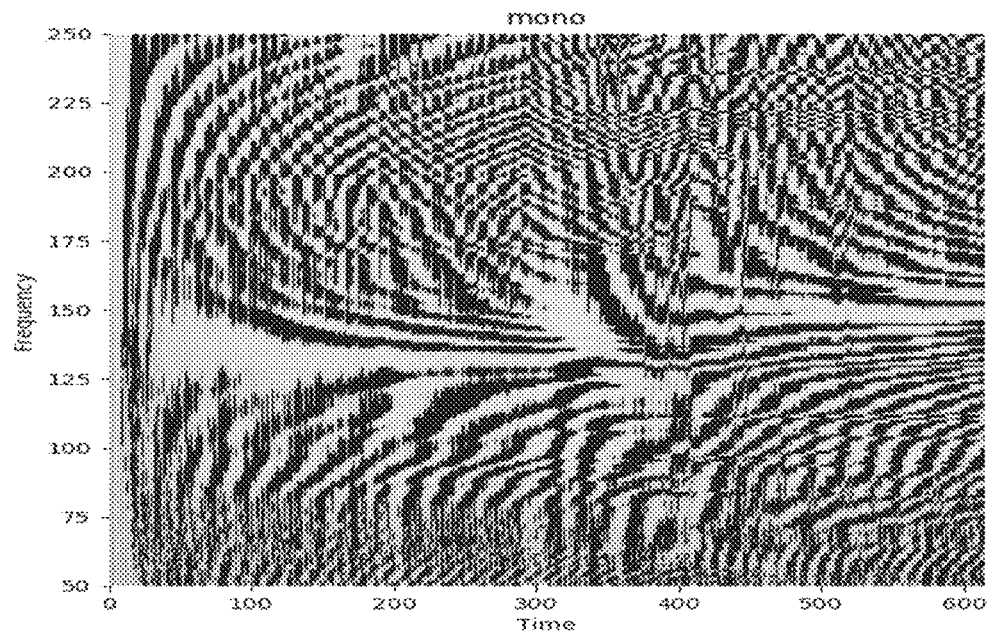
Figure 7B:
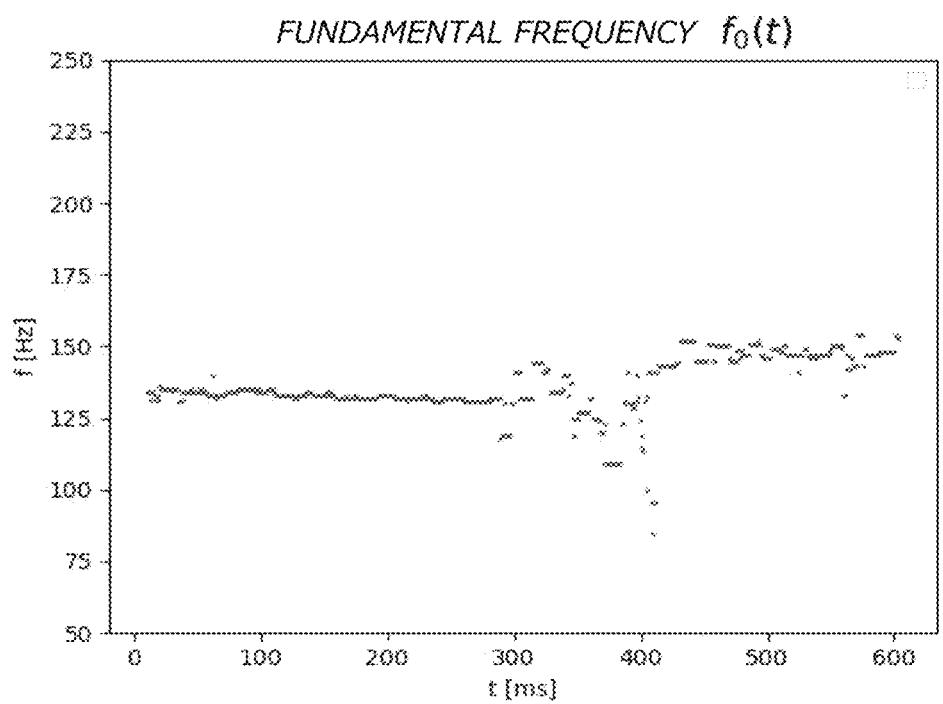
Figure 8A:
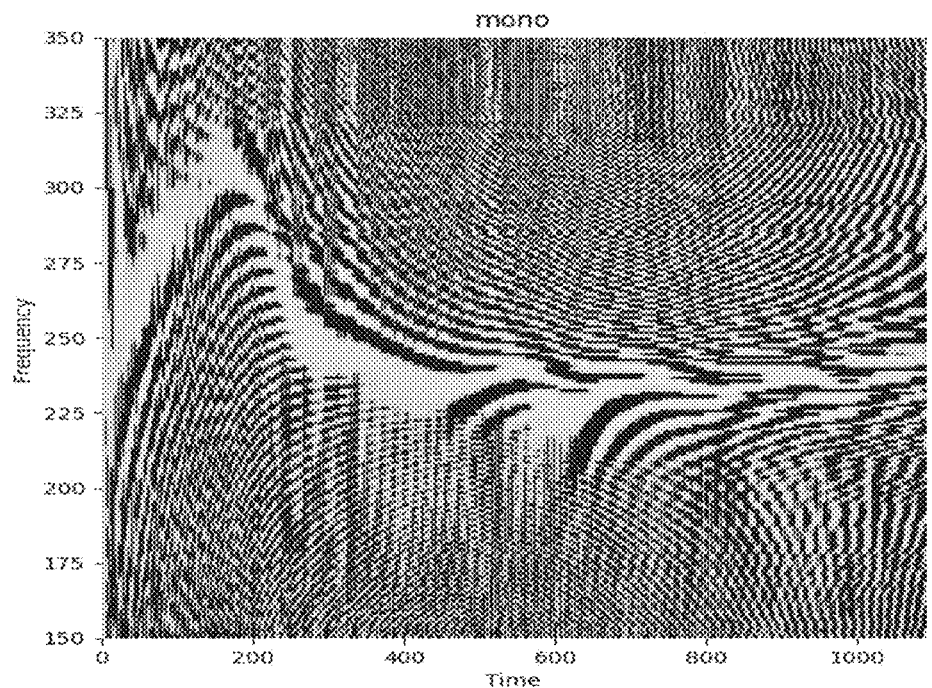
Figure 8B:
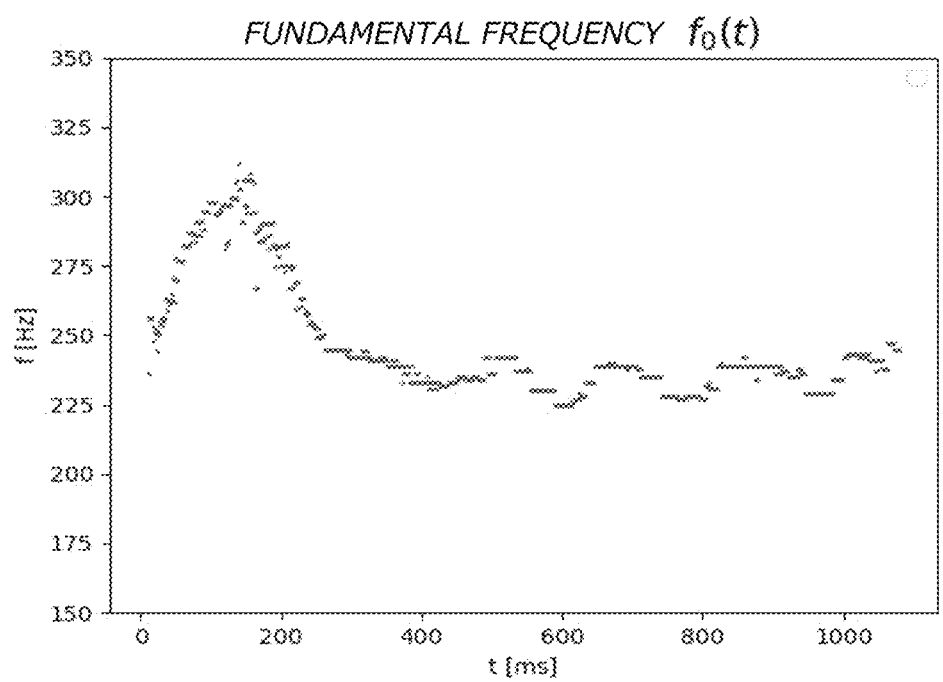

FIG. 7 is a set of diagrams showing a DJ transform spectrogram and a final fundamental frequency when the sound of a wind instrument is input, and FIGS. 8A-8B are a set of diagrams showing a DJ transform spectrogram and a final fundamental frequency when human voice is input.

In a method of extracting the fundamental frequency of an input sound according to an embodiment of the present disclosure, the measurement precision enables the resultant frequency obtained by processing the input sound using the method to be determined within an error range of 5 Hz.

In the method of extracting a fundamental frequency of an input sound according to an embodiment of the present disclosure, a spectrogram variance corresponding to the lowest frequency may be smaller than spectrogram variances corresponding to other frequencies in a spectrogram of the result obtained by processing the input sound using the method.

As seen from FIGS. 3A-3G, 4A-4G, 7, and 8A-8B, a spectrogram variance corresponding to the fundamental frequency may be smaller than spectrogram variances of other frequencies.

Figure 9:
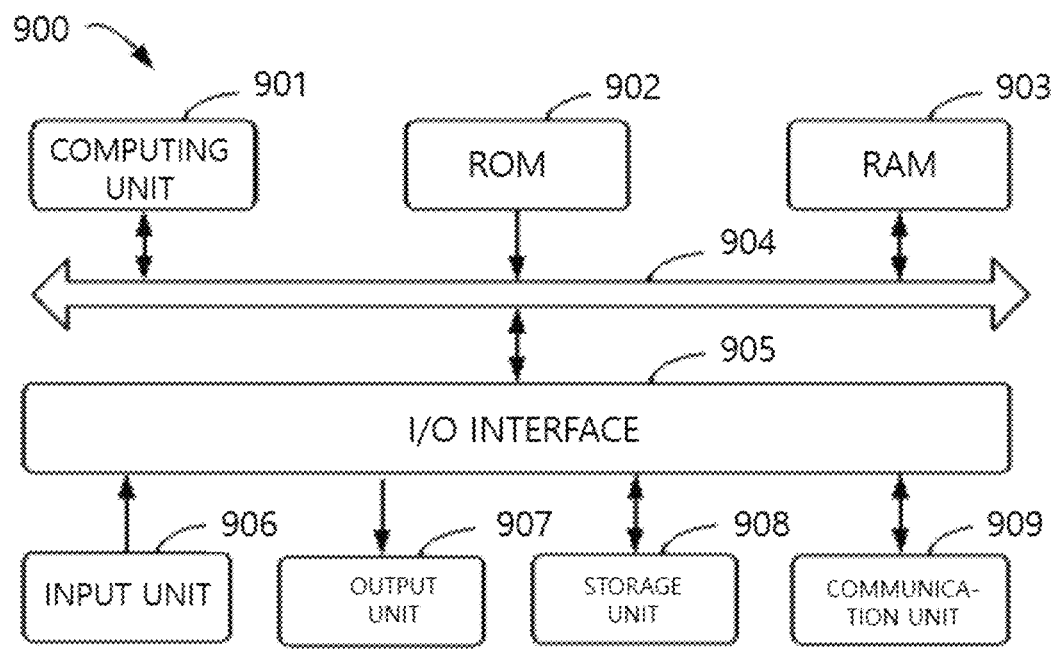
FIG. 9 is a block diagram showing a sound processing device according to an embodiment of the present disclosure.
Figure 10:
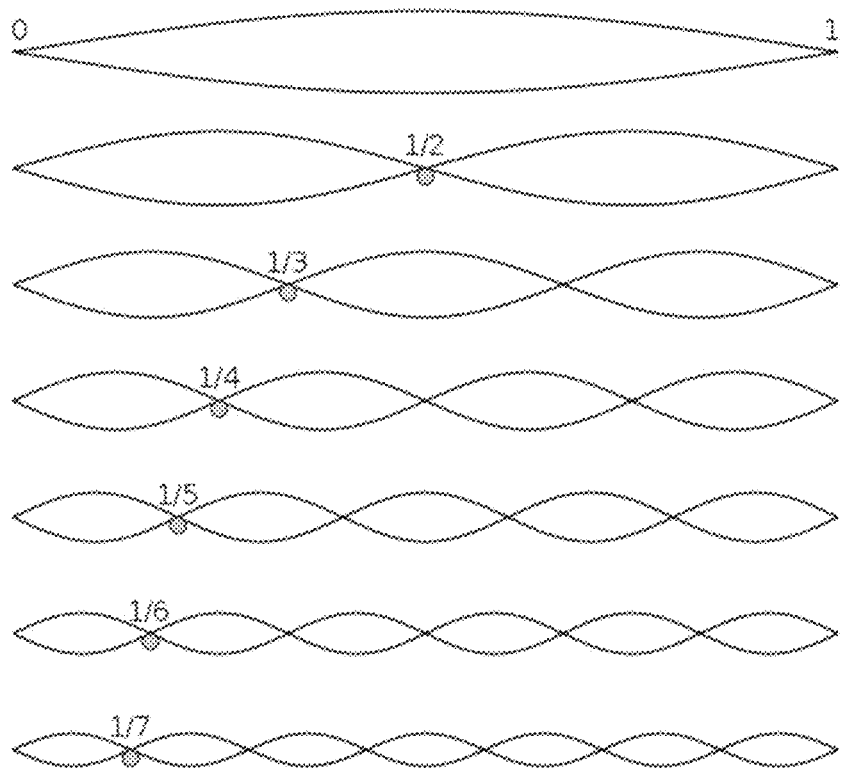
FIG. 10 is a diagram for explaining a harmonic wave.

FIG. 9 is a block diagram showing a sound processing device according to an embodiment of the present disclosure.

The sound processing device may be any one of various types of digital computers. For example, the sound processing device may be a laptop computer, a desktop computer, a workstation, a server, a blade server, a mainframe, or any other suitable computers. Alternatively, the sound processing device may be any one of various types of mobile devices. For example, the sound processing device may be a personal digital assistant (PDA), a cellular phone, a smartphone, a wearable device, or any other similar computing devices. Components, connections and relations therebetween, and functions thereof, disclosed in the present disclosure, are merely illustrative and do not limit the scope of the present disclosure.

As shown in FIG. 9, the sound processing device 900 includes a computing unit 901, and performs an appropriate operation and process according to a computer program stored in a read-only memory (ROM) 902 or a computer program loaded into a random access memory (RAM) 903 from a storage unit 908. The RAM 903 may store programs and data required to operate the sound processing device 900. The computing unit 901, the ROM 902, and the RAM 903 are connected to each other via a bus 904. An I/O interface 905 is also connected to the bus 904.

A plurality of components of the sound processing device 900 are connected to the I/O interface 905. The plurality of components include an input unit 906, such as a keyboard, a mouse, or a microphone, an output unit 907, such as a monitor, or a speaker, a storage unit 908, such as a magnetic disk or an optical disc, and a communication unit 909, such as a network card, a modem, or a wireless communication transceiver. For example, a sound from which a fundamental frequency is to be extracted may be input through the microphone. The communication unit 909 allows the sound processing device 900 to exchange information/data with other devices through a computer network, such as the Internet, and/or telegraph networks.

The computing unit 901 may be a general purpose/dedicated processing component having processing and calculation functions. Some examples of the computing unit 901 include, but are not limited to, a central processing unit (CPU), a graphics processing unit (GPU), a dedicated artificial intelligence calculation chip, a computing unit configured to execute a machine learning model algorithm, a digital signal processor (DSP), and any other suitable processors, controllers, and microcontrollers. The computing unit 901 performs the sound processing method described above. For example, in an embodiment, the sound processing method may be implemented by a computer software program and may be stored in a machine-readable medium, such as the storage unit 908. In an embodiment, some or the entirety of a computer program may be loaded into and/or installed in the sound processing device 900 by the ROM 902 and/or the communication unit 909. When the computer program is loaded into the RAM 903 and executed by the computing unit 901, one step or a plurality of steps of the sound processing method described above may be performed. In another embodiment, the computing unit 901 is configured to perform the sound processing method according to the embodiment of the present disclosure in any other suitable manners (e.g. firmware).

In the present disclosure, the machine-readable medium may be a machine-readable signal medium or a machine-readable storage medium. The machine-readable medium may include, but is not limited to, electronic, magnetic, optical, electromagnetic, infrared, or semiconductor systems, apparatuses, and devices, or suitable combinations thereof. More specific examples of the machine-readable storage medium may include electrical connection based on one line or a plurality of lines, a portable computer disk, a hard disk, a random access memory (RAM), a read-only memory (ROM), a erasable programmable read-only memory (EPROM or flash memory), optical fiber, CD-ROM, an optical storage device, a magnetic storage device, or any suitable combinations thereof.

A sound may be input to the sound processing device 900 through the microphone. The sound input through the microphone may be stored in an electronic form and may then be used. Alternatively, the input sound may be directly provided as an electronic file through the storage unit 908 or may be stored in an electronic form through the communication unit 909 and may then be used.

In this embodiment, the extracted fundamental frequency may be used to recognize the input sound or to synthesize the sound.

The sound processing method and the sound processing device according to this embodiment may be applied to an object, such as a musical instrument, as well as the voice of a person. That is, the sound processing method and the sound processing device may be used to recognize and synthesize the sound of any one of various kinds of objects, such as musical instruments, as well as the person.

Although the present disclosure has been described in detail with reference to exemplary embodiments, the present disclosure is not limited thereto, and various changes and applications can be made without departing from the technical spirit of the present disclosure, which will be obvious to a person skilled in the art. Therefore, the scope of protection for the present disclosure should be determined based on the following claims, and all technical ideas falling within the scope of equivalents thereto should be interpreted as being included in the scope of the present disclosure.

What is claimed is:

1. A sound processing method performed by a computer, the method comprising:
generating a DJ transform spectrogram indicating estimated pure-tone amplitudes for respective frequencies corresponding to natural frequencies of a plurality of springs and a plurality of time points by modeling an oscillation motion of the plurality of springs having different natural frequencies, with respect to an input sound, and calculating the estimated pure-tone amplitudes for the respective natural frequencies, wherein the generating the DJ transform spectrogram includes:
estimating expected steady-state amplitudes, each of which is a convergence value of an amplitude of each of the plurality of springs in a steady state, based on amplitudes at two time points having an interval there between equal to one natural period of each of the plurality of springs; and
calculating the estimated pure-tone amplitudes based on predicted pure-tone amplitudes that are amplitudes of the input sound estimated based on the expected steady-state amplitudes;
calculating degrees of fundamental frequency suitability based on a moving average of the estimated pure-tone amplitudes or a moving standard deviation of the estimated pure-tone amplitudes with respect to each natural frequency of the DJ transform spectrogram;
extracting the fundamental frequency based on local maximum values of the degrees of fundamental frequency suitability for the respective natural frequencies at each of the plurality of time points;
providing, based on the fundamental frequency, a resultant frequency comprising a high measurement precision of least one of: (a) temporal resolution or (b) frequency resolution, and
identifying the input sound or synthesizing an output sound, based on the resultant frequency.

2. The method of claim 1, wherein the estimated pure-tone amplitudes are same as the predicted pure-tone amplitudes.

3. The method of claim 1, wherein the degrees of fundamental frequency suitability are proportional to the moving average of the estimated pure-tone amplitudes or are inversely proportional to the moving standard deviation of the estimated pure-tone amplitudes.

4. The method of claim 1, wherein the extracting the fundamental frequency includes:
generating a black-and-white spectrogram by extracting the N (N being an integer equal to or greater than 2) topmost degrees of fundamental frequency suitability among the degrees of fundamental frequency suitability at respective time points, setting values corresponding to natural frequencies corresponding to the N degrees of fundamental frequency suitability to "1", and setting remaining values to "0";
generating an average black-and-white spectrogram by calculating an average over each region of the black-and-white spectrogram, where the regions of the black-and-white-spectrogram have the same size containing each point of the black-and-white spectrogram; and
extracting the local maximum values in the average black-and-white spectrogram depending on the natural frequencies at the respective time points.

5. The method of claim 4, wherein the extracting the fundamental frequency further includes:
extracting a candidate fundamental frequency based on a difference between natural frequencies corresponding to adjacent local maximum values in the average black-and-white spectrogram depending on the natural frequencies, at respective time points, and a lowest frequency among the natural frequencies corresponding to local maximum values in the average black-and-white spectrogram.

6. The method of claim 5, wherein the extracting the fundamental frequency further includes:
setting a candidate fundamental frequency at a time point, when a moving average of a difference between the candidate fundamental frequencies at the time point and an adjacent time point is smallest among candidate fundamental frequencies at a plurality of time points, to a black-and-white-spectrogram-based fundamental frequency at each time point; and
setting a first region including a positive integer multiple of a time average of the black-and-white-spectrogram-based fundamental frequency, set for a predetermined time duration, and setting a value, obtained by dividing a frequency having a highest value in an average black-and-white spectrogram among frequencies belonging to the first region of the average black-and-white spectrogram at a time adjacent to the predetermined time duration by a positive integer (k) corresponding to the first region, to which the frequency having the highest value in the average black-and-white spectrogram belongs among frequencies belonging to the first region, to the black-and-white-spectrogram-based fundamental frequency at the time adjacent to the predetermined time duration.

7. The method of claim 6, wherein the extracting the fundamental frequency further includes:
setting a second region including a positive integer multiple of the black-and-white-spectrogram-based fundamental frequency at each time point and setting a value, obtained by dividing a frequency having a highest degree of fundamental frequency suitability among frequencies of the second region by a positive integer (I) corresponding to the second region to which the frequency having the highest degree of fundamental frequency suitability belongs, to the final fundamental frequency at each time point.

8. The method of claim 1, wherein a spectrogram variance corresponding to a lowest frequency is smaller than spectrogram variances corresponding to other frequencies in a spectrogram of a result obtained by processing the input sound using the method.

9. The method of claim 1, wherein each expected steady-state amplitude is calculated using an equation:

$$A_i^{ab}(\omega_{ext}) \simeq \frac{x_i(t=\tau_{n+1}) - x_i(t=\tau_n)e^{-\Gamma_i(\tau_{n+1}-\tau_n)}}{1 - e^{-\Gamma_i(\tau_{n+1}-\tau_n)}}$$

where $(\omega_{ext})$ is the expected steady-state amplitude of an ith spring $S_i$ of the plurality of springs, wherein i is a positive integer,
$x_i(t=T_n)$ and $x_i(t=T_{n+1})$ indicate amplitudes at two time points ($T_n$ and $T_{n+1}$) having an interval there between equal to one natural period of the spring $S_i$, and
$\Gamma_i$ is a damping constant per unit mass of the spring $S_i$.

10. The method of claim 1, wherein each predicted pure-tone amplitude is calculated using an equation:

$$F_{ext}(t) \simeq AZ(\omega_{ext})M\Gamma_i\omega_{ext}$$

where $F_{ext}(t)$ is the predicted pure-tone amplitude,
$A_i^{ab}(\omega_{ext})$; is the expected steady-state amplitude of an ith spring $S_i$ of the plurality of springs, wherein i is a positive integer,
M indicates a mass of an object fixed to an end of the spring $S_i$,
$\Gamma_i$ is a damping constant per unit mass of the spring $S_i$, and
$\omega_{ext}$ is an angular velocity of the input sound.

11. The method of claim 1, wherein the calculating the estimated pure-tone amplitudes includes:
calculating the predicted pure-tone amplitudes;
calculating transient-state-pure-tone amplitudes, which are amplitudes of an input sound estimated based on an amplitude during the one natural period of each of the plurality of springs, based on the amplitude during the one natural period of each of the plurality of springs; and
calculating filtered pure-tone amplitudes based on values obtained by multiplying the predicted pure-tone amplitudes by the transient-state-pure-tone amplitudes and calculating the estimated pure-tone amplitudes based on the calculated filtered pure-tone amplitudes.

12. The method of claim 11, wherein each transient-state-pure-tone amplitude is calculated using an equation:

$$F_{i,t}(t) \simeq A_{i,t}^{ab}(\omega_{ext})M\Gamma_i\omega_{ext}$$

where $F_{i,t}(t)$ is the transient-state-pure-tone amplitude of an ith spring $S_i$ of the plurality of springs, wherein i is a positive integer,
$A_{i,t}^{ab}(\omega_{ext})$ is a maximum value of a displacement during one natural period of the spring $S_i$ at time t,
M indicates a mass of an object fixed to an end of the spring $S_i$,
$\Gamma_i$ is a damping constant per unit mass of the spring $S_i$, and
$\omega_{ext}$ is an angular velocity of the input sound.

13. A non-transitory computer-readable recording medium having recorded thereon instructions that when performed by a computer, cause the computer to:
generate a DJ transform spectrogram indicating estimated pure-tone amplitudes for respective frequencies corresponding to natural frequencies of a plurality of springs and a plurality of time points by modeling an oscillation motion of the plurality of springs having different natural frequencies, with respect to an input sound, and calculating the estimated pure-tone amplitudes for the respective natural frequencies, wherein generating the DJ transform spectrogram includes:
estimating expected steady-state amplitudes, each of which is a convergence value of an amplitude of each of the plurality of springs in a steady state, based on amplitudes at two time points having an interval therebetween equal to one natural period of each of the plurality of springs, and
calculating the estimated pure-tone amplitudes based on predicted pure-tone amplitudes that are amplitudes of the input sound estimated based on the expected steady-state amplitudes;
calculate degrees of fundamental frequency suitability based on a moving average of the estimated pure-tone amplitudes or a moving standard deviation of the estimated pure-tone amplitudes with respect to each natural frequency of the DJ transform spectrogram;
extract the fundamental frequency based on local maximum values of the degrees of fundamental frequency suitability for the respective natural frequencies at each of the plurality of time points;
provide, based on the fundamental frequency, a resultant frequency comprising a high measurement precision of least one of: (a) temporal resolution or (b) frequency resolution, and
identify the input sound or synthesize an output sound, based on the resultant frequency.

\* \* \* \* \*